United States Patent
Furuya et al.

(10) Patent No.: US 7,517,103 B2
(45) Date of Patent: Apr. 14, 2009

(54) LIGHT CORRECTION MEMBER, LIGHT DIFFUSION MEMBER, DISPLAY MEMBER, AND DISPLAY USING THE SAME

(75) Inventors: Yoshiyuki Furuya, Susono (JP); Tetsuya Sugiyama, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/679,714

(22) Filed: Feb. 27, 2007

(65) Prior Publication Data

US 2007/0139906 A1 Jun. 21, 2007

Related U.S. Application Data

(62) Division of application No. 10/718,606, filed on Nov. 24, 2003, now Pat. No. 7,213,956.

(30) Foreign Application Priority Data

| Nov. 25, 2002 | (JP) | ............................. 2002-340894 |
| Nov. 25, 2002 | (JP) | ............................. 2002-340895 |
| Nov. 25, 2002 | (JP) | ............................. 2002-340896 |

(51) Int. Cl.
*G01D 11/28* (2006.01)

(52) U.S. Cl. .................... 362/30; 362/246; 362/558; 362/812; 40/451; 340/815.44

(58) Field of Classification Search ................ 40/450, 40/451, 551, 552, 570; 313/510; 340/815.44, 340/815.45; 345/45; 359/599; 362/29, 30, 362/246, 558, 812

See application file for complete search history.

(56) References Cited

U.S. PATENT DOCUMENTS

| 2,207,117 | A |   | 7/1940  | Collins |
| 3,497,981 | A |   | 3/1970  | Tyne |
| 3,918,053 | A | * | 11/1975 | Towne et al. ........... 340/815.45 |
| 4,918,578 | A |   | 4/1990  | Thompson |
| 6,259,713 | B1 |  | 7/2001  | Hwu et al. |

FOREIGN PATENT DOCUMENTS

| JP | 52-13901 B  | 3/1977 |
| JP | 61-229374 A | 10/1986 |
| JP | 8-162672 A  | 6/1996 |
| JP | 10-003275 A | 1/1998 |
| JP | 10-240165 A | 9/1998 |

OTHER PUBLICATIONS

Office Action for corresponding Japanese Application No. 2002-340896 dated Oct. 19, 2007.

* cited by examiner

*Primary Examiner*—Stephen F Husar
(74) *Attorney, Agent, or Firm*—Sughrue Mion, PLLC

(57) ABSTRACT

A display includes a display lightguide, on which a shape of a display character is formed in three dimensions, a light source, emitting a light toward the display lightguide, and a light collection portion, provided between the light source and the display lightguide, and having a light reflection face formed like a parabolic face which employs a straight line perpendicular to a light receiving face of the display lightguide as an axis thereof.

20 Claims, 18 Drawing Sheets

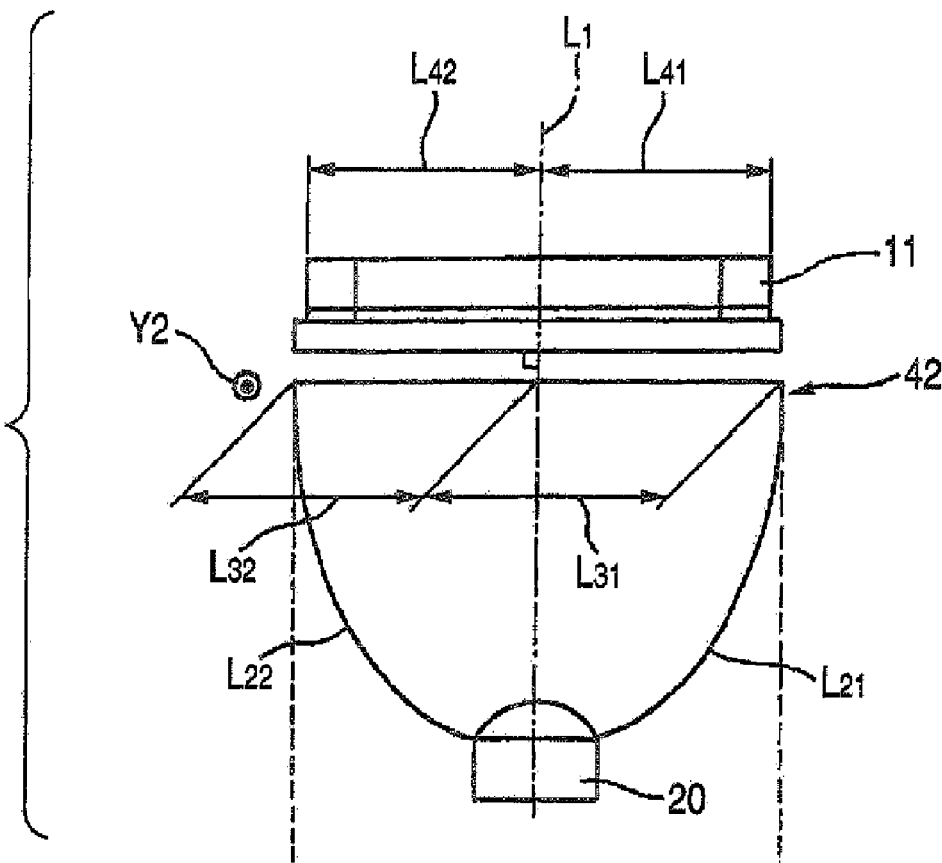
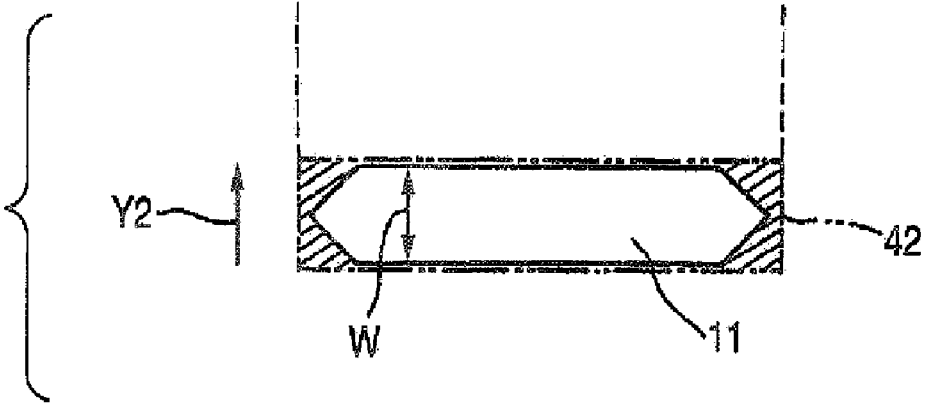

LIGHT CORRECTION MEMBER, LIGHT DIFFUSION MEMBER, DISPLAY MEMBER, AND DISPLAY USING THE SAME

This is a divisional of application Ser. No. 10/718,606 filed Nov. 24, 2003 now U.S. Pat. No. 7,213,956. The entire disclosure of the prior application, application Ser. No. 10/718, 606 is hereby incorporated by reference.

BACKGROUND OF THE INVENTION

This invention generally relates to a display, more particularly to a display having display lightguide which is shaped into display characters in three dimensions, and to a light collection portion for use in the display. Also, the present invention relates to a light diffusion member provided on the rear surface of a display portion on which a plurality of display characters illuminated by light that is incident thereon from behind. Further, the present invention relates to a display member having display lightguides each provided with a convex portion on which a display character is shaped in three dimensions.

Hitherto, from viewpoint of layout of design, there has been devised a display adapted to irradiate light on display lightguides, which are shaped into display characters in three dimensions, from behind so that the display lightguides luminously display the characters. However, in the case that a point light source, such as an LED, is used as a light source, the farther the location of a part of each of the display characters from the LED, the lower the brightness of the part.

For instance, in the case that as shown in FIG. 18, the shape of a segment constituting a numeral serving as a display character is formed on the display lightguide 11. Moreover, an LED 20 is disposed on the back face of the display lightguide 11 and at the nearly center C in the longitudinal direction Y1 thereof, the luminance in the longitudinal direction Y1 of the segment decreases toward a tip end from the center C. Thus, the related display has problems in that the display character does not have a three-dimensional appearance, and that presentation effects thereof are imparted.

Also, it has been devised to make a surface light source, which is opposed to display characters, by using a liquid crystal display (LCD). This related display has a problem in that the luminance of a liquid crystal display itself is low, thereby the luminance of the display characters is low as a whole.

Especially, in the case where a segment is shaped into a display lightguide, it has been devised to make a surface light source, which is shaped according to the shape of the segment, by using a vacuum fluorescent character display tube (VFT). However, a VFT has a gap formed between an illuminant, which serves as a luminous face, and a front glass. Therefore, this related display has problems in that although a VFT 30 is placed just behind the display lightguide 11 shaped into the segment when viewed from just front thereof as illustrated in FIG. 19A, the position of the VFT 30 is shifted from the place located just behind the segment when shifting the line of vision to the left, as illustrated in FIG. 19B.

Also, there has been devised a display adapted to irradiate light on a display portion that is constituted by lightguides, on which display characters are shaped in three dimensions, or by light blocking plates in which the shapes of display characters are cut out, thereby to luminously display the display characters. Moreover, it has been devised to provide a light diffusion plate between the display portion and a light source in the display in such a way as to cause all the display characters to uniformly emit light.

An example of such a display is a seven-segment display shown in FIG. 20A having a display portion, in which seven segments a to q constituting a numeral "8", and seven light sources 2a to 2g respectively provided on the rear surfaces of the segments a to q. In a case where a light diffusion plate 3 is provided in the seven-segment display in such a manner as to cover all the segments a to g, for example, when a light source 2a provided corresponding to the segment a is caused to emit light, the light is incident on the rear surfaces of the segments b and c through a light diffusion plate 3.

Thus, in a case that light diffusion plates 4 are respectively provided corresponding to the segments a to q independent of one another as shown in FIG. 20B, leakage of light therefrom to the segment other than the segment corresponding to the lighted light source is prevented. However, this related display has a problem in that assembly of the display becomes more troublesome wit increase in the number of components thereof.

Also, from viewpoint of layout of design, there has been devised a display adapted to irradiate light on a display portion having display lightguides each provided with a convex portion, on which a display character are shaped in three dimensions, from behind to thereby luminously display the display characters.

However, in the above related display, the three-dimensional shape of the display character is formed by the lightguide. The related display has problems in that especially, in a case where the display character is shaped on a transparent lightguide in three dimensions, it is difficult to visually cognize the three-dimensional shape, and that the display character cannot be seen as a three-dimensional image, with the result of spoiling the design thereof. Additionally, there have been demands for providing higher quality design in displaying characters in a display for luminously displaying three-dimensional display characters.

SUMMARY OF THE INVENTION

It is therefore a first object of the present invention to provide a display enabled to cause display characters, which are shaped on display lightguides in three dimensions, to uniformly emit light even when a light source is used.

Also, a second object of the present invention is to provide a light diffusion plate, which can reduce the number of components thereof and can simplify assembly thereof and can prevent light emitted to the rear surface of a predetermined display character from impinging upon the rear surface of another display character, and to provide a display using such a light diffusion plate.

Finally, a third object of the present invention is to provide a display portion that can improve design in displaying characters, and to provide a display having such a display portion.

In order to achieve the above object, according to the present invention, there is provided a display, comprising:

a display lightguide, on which a shape of a display character is formed in three dimensions;

a light source, emitting a light toward the display lightguide; and a light collection portion, provided between the light source and the display lightguide, and having a light reflection face formed like a parabolic face which employs a straight line perpendicular to a light receiving face of the display lightguide as an axis thereof.

In the above configuration, the light having impinged from the light source onto the light reflection surface can be reflected by the light reflection surface and emitted in a direction nearly perpendicular to the rear face of the display lightguide by placing the light source at a focal point of the parabola included in a section of the light reflection portion. That is, light can be output in a direction nearly perpendicular to a part of the display character shaped on the display lightguide, which is not located just front of the light source.

Preferably, the display further comprises a light diffusion member, provided between the display lightguide and the light collection portion.

In the above configuration, a light diffusion plate provided between the display lightguide and the light collection portion. Therefore, light emitted from the light source can be diffused by the light diffusion plate. Light coming from the light source can uniformly be output by the display lightguide.

Preferably, the display further comprises a blocking member, placed to a front side of the display lightguide, and having a hole portion which is formed so as to correspond to the shape of the display character.

In the above configuration, a blocking plate having a cutout portion cut out thereof along an outer periphery of the display character shaped on the display lightguide is provided to the front side of the display lightguide. Therefore, light output from a portion other than the part, on which the segment is shaped, is blocked by the blocking plate. Thus, the contrast between the part, on which the segment is shaped, and the remaining part can be increased.

Preferably, the light collection portion includes a light collection lightguide. An outer side face of the light collection lightguide is formed like the parabolic face as the light reflection face.

In the above configuration, the light collection portion comprises a light collection lightguide. An outer surface of this light collection lightguide is formed like the parabolic face and used as the light reflection face. Therefore, in the case that the light source is disposed at a focal point of a parabola included in a section of the parabolic face, light emitted from the light source is transmitted by the inside of the light collection lightguide. Thereafter, the light impinges upon the outer surface thereof. Then, the light is reflected by the light reflection face, which is the outer surface, and thus output to the rear face of the display lightguide.

Preferably, the light collection portion having a hole or a groove provided therein. An inner side face of the hole or the groove formed in the light collection portion is formed like the parabolic face as the light reflection face.

In the above configuration, the light collection portion has a hole or a groove provided therein. An inner face, in which the hole or the groove is formed, is formed like the parabolic face and used as the light reflection face. Therefore, in the case that the light source is disposed at a focal point of a parabola included in a section of the parabolic face of the inner surface, in which the hole or the groove is formed, light emitted from the light source impinges upon the inner surface thereof. Then, the light is reflected by the light reflection face, which is the inner surface, and thus output to the rear face of the display lightguide.

Preferably, a display segment is formed on the display lightguide as the display character. The light reflection face is formed by moving a parabola, which is included in a section of the parabolic face, in a direction perpendicular to a face formed by the parabola and the axis without changing a shape of the parabola.

In the above configuration, a display segment is formed in the display lightguide as the display character. The light reflection face is the same as a face formed by moving a parabola, which is included in a section of the parabolic face, in a direction perpendicular to a face formed by the parabola and the axis without changing the shape of the parabola.

Therefore, in the case where the shorter-side direction of the segment is made to coincide with the direction in which the parabola is moved, and where the light reflection face is disposed behind the display lightguide so that the axis is perpendicular to the rear face of the display lightguide, a given section obtained by cutting the light reflection face with a plane being parallel to the rear face of the display lightguide is perpendicular to the longer-side direction. Thus, light emitted from the light source in the longer-side direction of the segment when viewed from the front thereof is reflected by the light reflection face. Thereafter, the light can be output just to the front thereof, that is, in a direction perpendicular to the rear face of the display lightguide.

Preferably, a display segment is formed on the display lightguide as the display character. The light reflection face is formed by moving a parabola, which is included in a section of the parabolic face, in a direction perpendicular to a face formed by the parabola and the axis while continuously changing a gradient of the parabola, so that a shape drawn by each of ends of the parabola during the parabola is moved almost coincides with a shape of each of longer-side ends of the display segment.

In the above configuration, a display segment is formed in the display lightguide as the display character. The light reflection face is the same as the face formed by moving the parabola, which is included in a section of the parabolic face, in a direction perpendicular to the face, which is formed by the parabola and the axis, in such a way as to simultaneously and continuously changing a gradient of the parabola so that a shape, which is drawn by each of ends of the parabola during the parabola is moved, almost coincides with the shape of each of longer-side ends of the segment. Therefore, in the case where the light reflection face is disposed so that the ends of the parabola are placed behind the rear face in the longer-side direction of the segment, the light reflection face is positioned behind the ends in the longer-side direction of the segment. However, the light reflection face can be prevented from being provided at a part of the rear face thereof, which is other than the part shaped into the segment.

Preferably, a display segment is formed on the display lightguide as the display character. The light reflection face is formed by moving a parabola, which is included in a section of the parabolic face, in a direction perpendicular to a face formed by the parabola and the axis while intermittently changing a gradient of the parabola, so that a shape drawn by each of ends of the parabola during the parabola is moved almost coincides with a shape of each of longer-side ends of the segment.

In the above configuration, a display segment is formed in the display lightguide as the display character. The light reflection face is the same as the face formed by moving the parabola in a direction perpendicular to a face, which is formed by the parabola and the axis, in such a way as to simultaneously and intermittently changing the gradient of the parabola so that a shape, which is drawn by each of ends of the parabola during the parabola is moved, almost coincides with a shape of each of longer-side ends of the segment.

Therefore, in the case where the light reflection face is disposed so that the ends of the parabola are placed behind the rear face in the longer-side direction of the segment, the light reflection face is positioned behind the ends in the longer-side direction of the segment. However, the light reflection face can be prevented from being provided at a part of the rear face thereof, which is other than the part shaped into the segment. Additionally, a given section obtained by cutting the light reflection face with a plane being parallel to the rear face of the display lightguide is perpendicular to the longer-side direction.

Preferably, the display further comprises a substrate on which the light source is provided. The light collection portion is fixed on the substrate.

In the above configuration, the light collection portion is fixed at a predetermined place on the substrate. Therefore, the light source can easily be attached onto the rear face of the light collection portion only by fixing the light collection portion at the predetermined place on the substrate.

Preferably, a plurality of the light sources is formed. A plurality of the display characters are respectively formed so as to correspond to the light sources. The light collection portion has a light blocking member which has a plurality of through holes penetrating through from a rear face thereof to a front face thereof, the through holes corresponding to the display characters respectively. The light reflection face is provided in each of the through holes.

In the above configuration, the plurality of the light sources are provided. A plurality of display characters respectively corresponding to the plurality of the light sources are formed therein. Through holes, each of which is formed of a light blocking member and penetrates through the light collection portion from a rear face thereof to a front face thereof, are formed in the light collection portion in such a manner as to correspond to the plurality of display characters. The light reflection face is provided in each of the through holes. Therefore, in the case where each of the sources is disposed at the rear face side of an associated one of the through holes, and where the display character corresponding to each of the sources is disposed at the front side thereof, light having impinged into the rear-face-side opening portion of the through hole does not leak to the outside thereof. Such light is output only from the front-side opening portion of each of the through holes. Thus, light emitted from the light source can be prevented from being led to the other display characters.

According to the present invention, there is also provided a light collection member for collecting an irradiated light from a light source, and irradiating the corrected light to a display face so that a segment portion of the display face is illuminated, comprising:

a light reflection face, shaped like a parabolic face having a section which includes a parabola, wherein the parabolic face of the light reflection face is formed by moving the parabola in a direction perpendicular to a face formed by the parabola and an axis thereof without changing a shape of the parabola.

According to this light collection portion, the light reflection face has the same shape as the shape of the face formed by moving the parabola in a direction perpendicular to the face formed by the parabola and the axis without changing the shape of the parabola. Therefore, in the case where the direction, in which the parabola is moved, is made to coincide with the shorter-side direction of the segment, and where the light reflection face is disposed behind the display face so that the axis is perpendicular to the display face, a given section obtained by cutting the light reflection face with a plane being parallel to the display face is perpendicular to the longer-side direction thereof. Consequently, light emitted from the LED to the longer-side direction of the segment when viewed from the front thereof can be output just to the front, that is, in a direction perpendicular to the display face after reflected by the light reflection face.

According to the present invention, there is also provided a light collection member for collecting an irradiated light from a light source, and irradiating the corrected light to a display face so that a segment portion of the display face is illuminated, comprising:

a light reflection face, shaped like a parabolic face having a section which includes a parabola, wherein the parabolic face of the light reflection face is formed by moving the parabola in a direction perpendicular to a face formed by the parabola and an axis thereof while continuously changing a gradient of the parabola, so that a shape drawn by each of ends of the parabola during the parabola is moved almost coincides with a shape of each of longer-side ends of the segment portion.

According to this light collection portion, the light reflection face has the same shape as the shape of the face formed by moving the parabola in a direction perpendicular to a face, which is formed by the parabola and the axis, in such a way as to simultaneously and continuously changing the gradient of the parabola so that a shape, which is drawn by each of ends of the parabola during the parabola is moved, almost coincides with a shape of each of longer-side ends of the segment. Therefore, in the case where the light reflection face is disposed so that ends of the parabola included in a section of the light reflection face are placed on the rear face in the longer-side direction of the segment, the light reflection face is disposed on the rear face in the longer-side direction of the segment, and moreover, the light reflection face is prevented from being disposed at a part other than the portion placed just under the segment.

According to the present invention, there is also provided a light collection member for collecting an irradiated light from a light source, and irradiating the corrected light to a display face so that a segment portion of the display face is illuminated, comprising:

a light reflection face, shaped like a parabolic face having a section which includes a parabola, wherein the parabolic face of the light reflection face is formed by moving the parabola in a direction perpendicular to a face formed by the parabola and an axis thereof while intermittently changing a gradient of the parabola, so that a shape drawn by each of ends of the parabola during the parabola is moved almost coincides with a shape of each of longer-side ends of the segment portion.

According to this light collection portion, the light reflection face has the same shape as a shape of a face formed by moving the parabola in a direction perpendicular to the face, which is formed by the parabola and the axis, in such a way as to simultaneously and intermittently changing the gradient of the parabola so that a shape, which is drawn by each of ends of the parabola during the parabola is moved, almost coincides with a shape of each of longer-side ends of the segment.

Therefore, in the case where the light reflection face is disposed so that ends of the parabola included in a section of the light reflection face are placed on the rear face in the longer-side direction of the segment, the light reflection face is disposed on the rear face in the longer-side direction of the segment, and moreover, the light reflection face is prevented from being disposed at a part other than the portion placed just under the segment. Additionally, a given section obtained by cutting the light reflection face with a plane being parallel to the display face is perpendicular to the longer-side direction of the segment.

Therefore, a display, in which the entire display character formed on the display lightguide in three dimensional uniformly emit light even when a point light source is used, can be obtained.

In the above configuration, a light diffusion plate provided between the display lightguide and the light collection portion. Therefore, light emitted from the light source can be diffused by the light diffusion plate. Light coming from the light source can uniformly be output by the display lightguide. Consequently, a display, in which the entire display character formed on the display lightguide in three dimensional more uniformly emit light even when a point light source is used, can be obtained.

In the above configuration, a light output from a portion other than the part, on which the segment is shaped, is blocked by the blocking plate. Thus, a display, enabled to increase the contrast between the part, on which the segment is shaped, and the remaining part can be obtained.

In the above configuration, in the case that the light source is disposed at a focal point of a parabola included in a section of the parabolic face, light emitted from the light source is transmitted by the inside of the light collection lightguide. Thereafter, the light impinges upon the outer surface thereof. Then, the light is reflected by the light reflection face, which is the outer surface, and thus output to the rear face of the display lightguide. Consequently, a display, in which the entire display character formed on the display lightguide in three dimensional uniformly emit light even when a point light source is used, can be obtained.

In the above configuration, in the case that the light source is disposed at a focal point of a parabola included in a section of the parabolic face of the inner surface, in which the hole or the groove is formed, light emitted from the light source impinges upon the inner surface thereof. Then, the light is reflected by the light reflection face, which is the inner surface, and thus output to the rear face of the display lightguide. Consequently, a display, in which the entire display character formed on the display lightguide in three dimensional uniformly emit light even when a point light source is used, can be obtained.

In the above configuration, in the case where the shorter-side direction of the segment is made to coincide with the direction in which the parabola is moved, and where the light reflection face is disposed behind the display lightguide so that the axis is perpendicular to the rear face of the display lightguide, a given section obtained by cutting the light reflection face with a plane being parallel to the rear face of the display lightguide is perpendicular to the longer-side direction. Thus, light emitted from the LED in the longer-side direction of the segment when viewed from the front thereof is reflected by the light reflection face. Thereafter, the light can be output just to the front thereof, that is, in a direction perpendicular to the rear face of the display lightguide. Consequently, a display, in which the entire display character formed on the display lightguide in three dimensional more uniformly emit light even when a point light source is used, can be obtained.

In the above configuration, in the case where the light reflection face is disposed so that the ends of the parabola are placed behind the rear face in the longer-side direction of the segment, the light reflection face is positioned behind the ends in the longer-side direction of the segment. However, the light reflection face can be prevented from being provided at a part of the rear face thereof, which is other than the part shaped into the segment. Consequently, a display, which is enabled to prevent the end portions of the segment from becoming dark and to also prevent the light reflection faces respectively corresponding to the segments from interfering with one another even when the plurality of the segments are placed close to one another, can be obtained.

In the above configuration, in the case where the light reflection face is disposed so that the ends of the parabola are placed behind the rear face in the longer-side direction of the segment, the light reflection face is positioned behind the ends in the longer-side direction of the segment. However, the light reflection face can be prevented from being provided at a part of the rear face thereof, which is other than the part shaped into the segment. Consequently, the end portions of the segment can be prevented from becoming dark. Also, the light reflection faces respectively corresponding to the segments can be prevented from interfering with one another even when the plurality of the segments are placed close to one another. Additionally, a given section obtained by cutting the light reflection face with a plane being parallel to the rear face of the display lightguide is perpendicular to the longer-side direction. Thus, light emitted from the light source in the longer-side direction of the segment when viewed from the front thereof is reflected by the light reflection face. Thereafter, the light can be output just to the front thereof, that is, in a direction perpendicular to the rear face of the display lightguide. Consequently, a display providing such advantages can be obtained.

In the above configuration, the light source can easily be attached onto the rear face of the light collection portion only by fixing the light collection portion at the predetermined place on the substrate. Consequently, a display facilitating the assembly thereof can be obtained.

In the above configuration, in the case where each of the light sources is disposed at the rear face side of an associated one of the through holes, and where the display character corresponding to each of the light sources is disposed at the front side thereof, light having impinged into the rear-face-side opening portion of the through hole does not leak to the outside thereof. Such light is output only from the front-side opening portion of each of the through holes. Thus, light emitted from the light source can be prevented from being led to the other display characters. Consequently, a display, which is enabled to prevent a display character corresponding to a light source from emitting light when turning on the light source, can be obtained.

In the above configuration, in the case where the direction, in which the parabola is moved, is made to coincide with the shorter-side direction of the segment, and where the light reflection face is disposed behind the display face so that the axis is perpendicular to the display face, a given section obtained by cutting the light reflection face with a plane being parallel to the display face is perpendicular to the longer-side direction thereof. Consequently, light emitted from the LED to the longer-side direction of the segment when viewed from the front thereof can be output just to the front, that is, in a direction perpendicular to the display face after reflected by the light reflection face. Thus, a display, in which the entire display character formed on the display lightguide in three dimensional uniformly emit light, can be obtained.

In the above configuration, in the case where the light reflection face is disposed so that ends of the parabola included in a section of the light reflection face are placed on the rear face in the longer-side direction of the segment, the light reflection face is disposed on the rear face in the longer-side direction of the segment, and moreover, the light reflection face is prevented from being disposed at a part other than the portion placed just under the segment. Consequently, a display, which is enabled to prevent the end portions of the segment from becoming dark and to also prevent the light reflection faces respectively corresponding to the segments from interfering with one another even when the plurality of the segments are placed close to one another, can be obtained.

In the above configuration, in the case where the light reflection face is disposed so that ends of the parabola included in a section of the light reflection face are placed on the rear face in the longer-side direction of the segment, the light reflection face is disposed on the rear face in the longer-side direction of the segment, and moreover, the light reflection face is prevented from being disposed at a part other than the portion placed just under the segment. Thus, the end portions of the segment are prevented from becoming dark. Also, the light reflection faces respectively corresponding to the segments are prevented from interfering with one another even when the plurality of the segments are placed close to one another. Additionally, a given section obtained by cutting the light reflection face with a plane being parallel to the display face is perpendicular to the longer-side direction of the segment. Thus, light emitted from the light source in the longer-side direction of the segment when viewed from the front thereof is reflected by the light reflection face. Thereafter, the light can be output just to the front thereof, that is, in a direction perpendicular to the rear face of the display lightguide. Consequently, a display providing such advantages can be obtained.

According to the present invention, there is also provided a light diffusion member for diffusing a light to be irradiated into a display member, the display member having a plurality of display characters which are illuminated by the light, comprising:

a plurality of light diffusion portions, disposed so as to correspond to the display characters; and a connection portion, connecting the diffusion portions to one another.

In the above configuration, the diffusion portions are respectively placed behind a plurality of display characters. The plurality of diffusion portions are connected to one another by the curved connection portion. Therefore, the light diffusion plate can be integrally formed with the plurality of diffusion portions by connecting the plurality of diffusion portions to one another through the connection portion. The connection portion is curve-formed. This prevents light, which has impinged from a predetermined one of the diffusion portions, from propagating through the connection portion and then impinging upon the other diffusion portions.

Preferably, when at least four display segments are placed as the display characters on four sides surrounding a space, at least four diffusion portions is placed on four sides surrounding a space so as to respectively correspond to the four display segments. The connection portion is formed so as to extend from a nearly center of the space surrounded by the diffusion portions to each of the diffusion portions.

In the above configuration, at least four display segments are formed in such a way as to be placed as the plurality of display characters on four sides surrounding a space. At that time, at least four of the plurality of diffusion portions placed on four sides surrounding a space in such a way as to respectively correspond to the placed four display segments. The connection portion is formed in such a way as to extend from a nearly center of the space surrounded by the diffusion portions to each of the diffusion portions in such a manner as to be connected to each of the diffusion portions. Therefore, the linear connection portion can be lengthened by forming the connection portion in such extend from the nearly center of the space surrounded by the diffusion portions to each of the diffusion portions.

Preferably, the connection portion has a plurality of extending parts respectively extending from the nearly center to the diffusion portions. The extending parts have differently curves respectively.

In the above configuration, the connection portion is formed in such a way as to have the parts respectively extending from the nearly center to the diffusion portions so that the parts are differently curved. Therefore, the curvature of the connection portion can be set at a large value.

According to the present invention, there is also provided a light diffusion member for diffusing a light to be irradiated into a display member, the display member having a plurality of display characters which are illuminated by the light, comprising:

a light blocking portion provided at a position corresponding to a boundary portion between adjacent display characters.

Preferably, the light blocking portion is either a concave portion or a convex portion formed on the light diffusion member.

In the above configuration, a concave portion or a convex portion is provided at a portion to be placed behind the boundary between the adjoining ones of the plurality of display characters. Therefore, even when the light diffusion plate is formed like a single plate in such a way as to cover all the plurality of display characters, light having impinged upon the rear face of a predetermined one of the diffusion portion is blocked by the concave portion or the convex portion and does not impinge upon the other diffusion portions.

Preferably, the display member has a plurality of display lightguides, each display lightguide having the display character formed in three dimensions. Light diffusion member is integrally formed with the display lightguides.

In the above configuration, the display portion has the plurality of display lightguides on each of which one of the plurality of display characters is formed in three dimensions. At that time, the light diffusion plate is integrally formed with the display lightguides. Therefore, both reduction in the number of components and simplification of the assembly of the light diffusion plate can be achieved by integrally forming the display lightguides with the light diffusion plate.

Here, it is preferable that, the light diffusion member is integrally formed with the display lightguides by injecting a forming agent for forming the display lightguides into a mold for the display lightguides, during a state in which the light diffusion member is inserted into the mold.

In the above configuration, the light diffusion plate and the display lightguides are integrally formed by injecting a forming agent for forming the display lightguides into a mold for molding the display lightguides, during a state in which the light diffusion plate is inserted into the mold. Consequently, the light diffusion plate can easily be formed in such a manner as to be integral with the display lightguides.

Here, it is preferable that, the light diffusion member is integrally formed with the display lightguides by two-color forming using a forming agent for forming the light diffusion member and a forming agent for forming the display lightguides.

In the above configuration, the light diffusion plate and the display lightguides are integrally formed by two-color forming using the forming agent therefor and the forming agent for forming the display lightguides. Thus, the light diffusion plate can easily be formed in such a manner as to be integral with the display lightguides.

According to the present invention, there is also provided a display comprising:

a light source, irradiating a light;

a light diffusion member, having a plurality of diffusion portions which diffuse the light from the light source, and having a curved connection portion which connects the diffusion portions; and a display portion, having a plurality of display characters to be illuminated by the diffused light, wherein the diffusion portions are placed so as to correspond to the display characters respectively.

In the above configuration, the display portion is provided so that a plurality of display characters adapted be illuminated by light having impinged from behind are formed thereon. In the light diffusion plate, a plurality of diffusion portions are respectively placed behind the plurality of display characters. A curved connection portion connects the plurality of diffusion portions to one another. A light source is provided behind the light diffusion plate. Therefore, the light diffusion plate can be integrally formed with the plurality of diffusion portions by connecting the diffusion portions to one another through the connection portion. The connection portion is curve-formed, so that light having impinged upon the rear face of a predetermined one of the diffusion portions is prevented from propagating through the connection portion and from impinging upon the other diffusion portions.

According to the present invention, there is also provided a display comprising:

a light source, irradiating a light;

a light diffusion member, diffusing the light from the light source; and a display portion, having a plurality of display characters to be illuminated by the diffused light, wherein a light blocking portion is formed on the light diffusion member so as to correspond to a boundary portion between adjacent display characters.

Preferably, the light blocking portion is either a concave portion or a convex portion formed on the light diffusion member.

In the above configuration, the display portion is provided so that a plurality of display characters adapted be illuminated by light having impinged from behind are formed thereon. In the light diffusing plate provided behind the display portion, a concave portion or a convex portion is provided at a portion to be placed behind the boundary between adjoining ones of the plurality of display characters. Therefore, even when the light diffusion plate is formed like a single plate in such a manner as to cover all the plurality of display characters, light having impinged behind a predetermined one of the diffusion portions is blocked by the concave portion or the convex portion and does not impinge upon the other diffusion portions.

As described above, the light diffusion plate can be integrally formed with the plurality of diffusion portions by connecting the diffusion portions to one another through the connection portion. Thus, the reduction in the number of components thereof and the simplification of assembly thereof can be achieved. The connection portion is curve-formed. Thus, light having impinged upon the rear face of a predetermined one of the diffusion portions is prevented from propagating through the connection portion and from impinging upon the other diffusion portions. Consequently, a light diffusion plate and a display, which prevent light emitted to the rear face of a predetermined one of the display characters from impinging upon the other display characters, can be obtained.

In the above configuration, the linear connection portion can be lengthened by forming the connection portion in such extend from the nearly center of the space surrounded by the diffusion portions to each of the diffusion portions. Consequently, a light diffusion plate, which more reliably and certainly prevents light emitted to the rear face of a predetermined one of the display characters from impinging upon the other display characters, can be obtained.

In the above configuration, the curvature of the connection portion can be increased. Thus, a light diffusion plate, which more reliably and certainly prevents light emitted to the rear face of a predetermined one of the display characters from impinging upon the other display characters, can be obtained.

In the above configuration, even when the light diffusion plate is formed like a single plate in such a way as to cover all the plurality of display characters, light having impinged upon the rear face of a predetermined one of the diffusion portion is blocked by the concave portion or the convex portion and does not impinge upon the other diffusion portions. Consequently, a light diffusion plate and a display, which are enabled to achieve both reduction in the number of components and simplification of the assembly of the light diffusion plate and to prevent light emitted to the rear face of a predetermined one of the display characters from impinging upon the other display characters, can be obtained.

In the above configuration, a light diffusion plate, which achieves both reduction in the number of components and simplification of the assembly thereof by being integrally formed with the display lightguides, can be obtained.

In the above configuration, a light diffusion plate, which is easily integrally formed with the display lightguides, can be obtained.

According to the present invention, there is also provided a display member, comprising:

a display lightguide, provided with a convex portion having a top face shaped into a display character, wherein a light diffusion processing is performed on at least one of the top face and a side face of the convex portion.

According to the first display portion of the invention, light diffusion processing is performed on the top face of the convex portion or side faces thereof. Therefore, the boundary between the top face of the convex portion, on which a display character is shaped, and each of sides thereof is clearly and visually identified by performing light diffusion processing on the top face of the convex portion or on the side faces thereof. Further, this light diffusion processing makes the display character appear more three-dimensional. When light diffusion processing is performed on both the top face and the sides of the convex portion, the entire convex portion is more clearly illuminated, so that the display character looks more three-dimensional.

According to the present invention, there is also provided a display member, comprising:

a display lightguide, provided with a convex portion having a top face shaped into a display character, wherein a side face of the convex portion is tapered off toward the top face of the convex portion.

In the above configuration, the sides of the convex portion are tapered off toward the top face thereof. Therefore, even when the top face thereof is viewed from just above, the sides of the convex portion can be visually identified. Further, the display characters appear more three-dimensional.

According to the present invention, there is also provided a display member, comprising:

a display lightguide, provided with a convex portion having a top face shaped into a display character, wherein a light diffusion processing is performed on a bottom face opposed to the top face of the convex portion in the display lightguide.

In the above configuration, light diffusion processing is performed on the bottom face of the convex portion. Therefore, light having impinged upon the bottom face, on which light diffusion processing is performed, is diffused on the bottom face. Subsequently, the light uniformly impinges upon the entire top face thereof. Thus, the top face portion, on which the display character is shaped, is clearly illuminated. Thus, the display character can have a more three-dimensional appearance.

According to the present invention, there is also provided a display member, comprising:

a display lightguide, provided with a convex portion having a top face shaped into a display character in three dimensions, wherein the convex portion is provided in a concave portion formed on the display member.

In the above configuration, the convex portion, on which the display character is shaped in three-dimensional, is provided in the concave portion. Therefore, the display character shaped on the convex portion can have a more three-dimensional appearance.

According to the present invention, there is also provided a display member, comprising:

a plurality of display lightguides, respectively provided with convex portions, each convex portion having a top face shaped into a display character in three dimensions; and a dark member, connecting the display lightguides to one another.

In the above configuration, a plurality of display lightguides are provided. The plurality of display lightguides are connected to one another by the dark member. Therefore, even when the plurality of display lightguides are connected to one another and integrally formed with one another, light having impinged upon the rear face of a predetermined display lightguide is blocked by the dark member. Thus, such light does not impinge upon the other display lightguides.

According to the present invention, there is also provided a display member, comprising:

a display lightguide, provided with a convex portion having a top face shaped into a display character in three dimensions, wherein at least a part of the convex portion is comprised of a colored part.

In the above configuration, at least a part of the convex portion is constituted by a colored part of the display lightguide. Therefore, achromatic light impinges upon the lightguide on which the display character is formed in three dimensions, the lightguide can be illuminated with the color given thereto.

According to the present invention, there is also provided a display comprising:

a display member, including a display lightguide which is provided with a convex portion having a top face shaped into a display character; and a light source, emitting a light to the display member, wherein a light diffusion processing is performed on at least one of the top face and a side face of the convex portion.

This display can improve design in displaying characters.

In the above configuration, the boundary between the top face of the convex portion, on which a display character is shaped, and each of sides thereof is clearly and visually identified by performing light diffusion processing on the top face of the convex portion or on the side faces thereof. Further, this light diffusion processing makes the display character appear more three-dimensional. When light diffusion processing is performed on both the top face and the sides of the convex portion, the entire convex portion is more clearly illuminated, so that the display character looks more three-dimensional. Consequently, a display portion enabled to improve design in displaying characters can be obtained.

In the above configuration, even when the top face thereof is viewed from just above, the sides of the convex portion can be visually identified. Further, the display characters appear more three-dimensional. Thus, a display portion enabled to improve design in displaying characters can be obtained.

In the above configuration, light having impinged upon the bottom face, on which light diffusion processing is performed, is diffused on the bottom face. Subsequently, the light uniformly impinges upon the entire top face thereof. Thus, the top face portion, on which the display character is shaped, is clearly illuminated. The display character can have a more three-dimensional appearance. Consequently, a display portion enabled to improve design in displaying characters can be obtained.

In the above configuration, the convex portion is provided in the concave portion. Thus, the display character shaped on the convex portion can have a more three-dimensional appearance. Consequently, a display portion enabled to improve design in displaying characters can be obtained.

In the above configuration, even when the plurality of display lightguides are connected to one another and integrally formed with one another, light having impinged upon the rear face of a predetermined display lightguide is blocked by the dark member. Thus, such light does not impinge upon the other display lightguides. Consequently, a display portion enabled to improve design in displaying characters can be obtained.

In the above configuration, achromatic light impinges upon the lightguide on which the display character is formed in three dimensions, the lightguide can be illuminated with the color given thereto. Consequently, a display portion enabled to improve design in displaying characters can be obtained.

In the above configuration, a display portion enabled to improve design in displaying characters can be obtained.

BRIEF DESCRIPTION OF THE DRAWINGS

The above objects and advantages of the present invention will become more apparent by describing in detail preferred exemplary embodiments thereof with reference to the accompanying drawings, wherein:

FIG. 3A is a side view illustrating display a lightguide 10, a light collection lightguide 42 and an LED 20, which are shown in FIG. 2;

FIG. 3B is a front view illustrating the light collection lightguide 42 and the display lightguide 11;

FIGS. 17A and 17B are sectional views illustrating a convex portion 11a;

DETAILED DESCRIPTION OF THE PREFERRED EMBODIMENTS

First Embodiment

Figure 1:
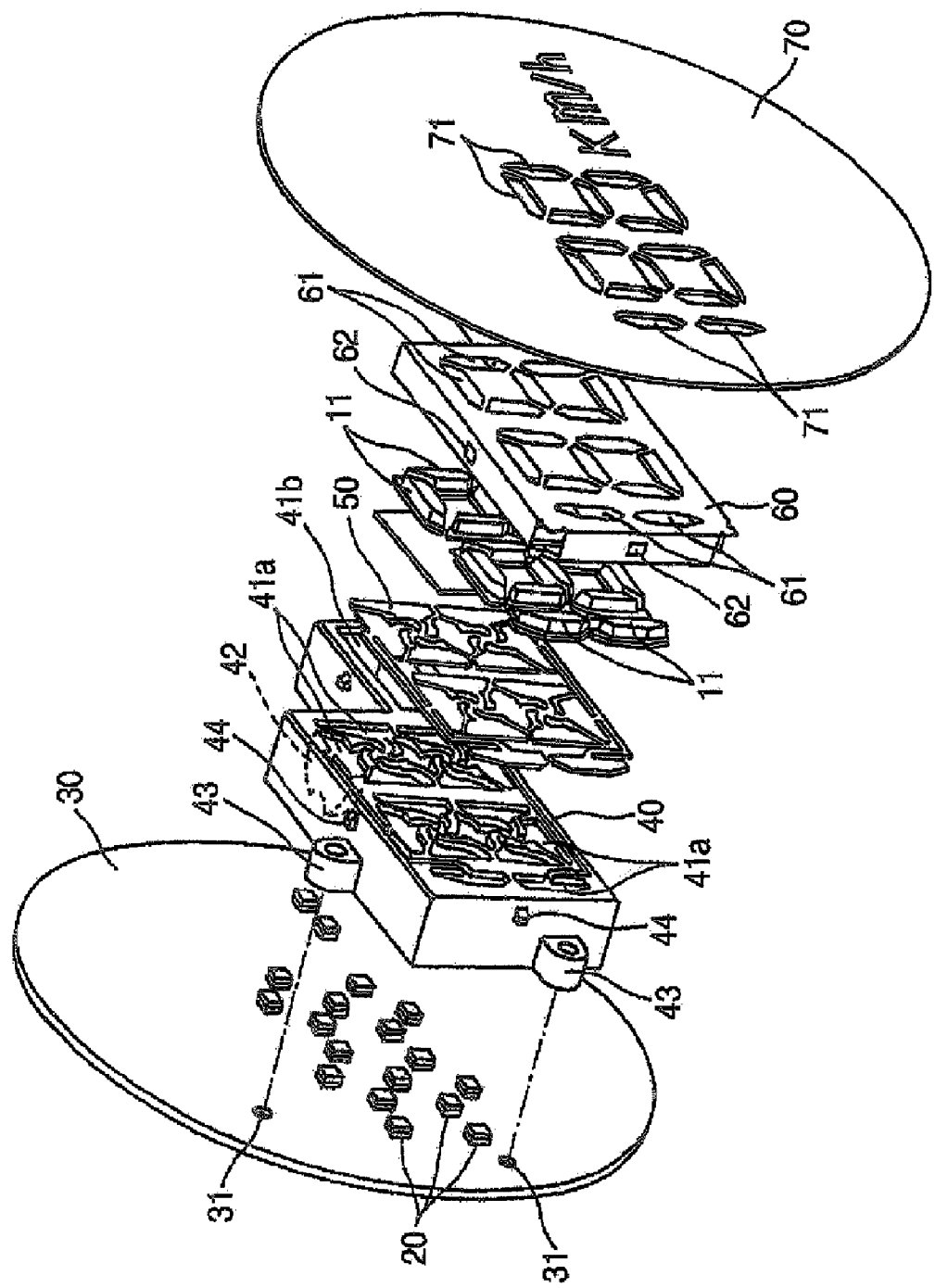
FIG. 1 is a perspective view illustrating an embodiment of the invention in a case that a display according to the invention is applied to a digital speed meter.

A display, into which a light collection portion, a light diffusion portion, and lightguide according to the invention is incorporated, is described with reference to the accompanying drawings. FIG. 1 is a perspective view illustrating an embodiment of the invention in a case that a display according to the invention is applied to a digital speed meter. As illustrated in this figure, the display has display lightguides 11 in each of which an associated one of display segments and letters representing the unit of speed (km/h) is shaped in three dimensions as a display character (incidentally, display lightguides 11, in each of which an associated one of the letters representing the unit of speed is shaped in three dimensions as a display character, are not shown in this figure).

The number of the shaped segments is, for example, 16. The display lightguides 11 are provided as different parts by being shaped into the sixteen segments, respectively. Incidentally, the sixteen segments are disposed in such a way as to represent a numeral "188". Eighteen LEDs 20 are disposed behind the display lightguides 11. Sixteen of the eighteen LEDs 20 are placed on a substrate 30 in such a manner as to be positioned behind the sixteen segments. The remaining two of the LEDs 20 are placed on the substrate 30 in such a way as to be positioned behind the letters.

A box-like light collection portion 40 for collecting light emitted from the LEDs 20 onto the display lightguides 11, and a light diffusion plate 50 for diffusing light output from the light collection portion 40 to the display lightguides 11 are provided between the display lightguides 11 and the LEDs 20. A blocking plate 60, which has cutout portions 61 cut out thereof along the outer peripheries of the shapes of the segments and the letters, and a decorative plate 70 having similar cutout portions 71 are disposed in front of the display lightguides 11. Also, the blocking plate 60 and the display lightguides 11 constitute the display portion.

The light collection portion 40 is formed of a light blocking member, and provided with sixteen through holes 41a, which are bored at places facing the segments and penetrate therethrough from the rear face thereof to the front face thereof, and a through hole 41b bored at a place facing the letters and penetrate therethrough from the rear face thereof to the front face thereof. Further, light collection lightguides 42 are inserted into the through holes 41a and 41b.

Figure 2:
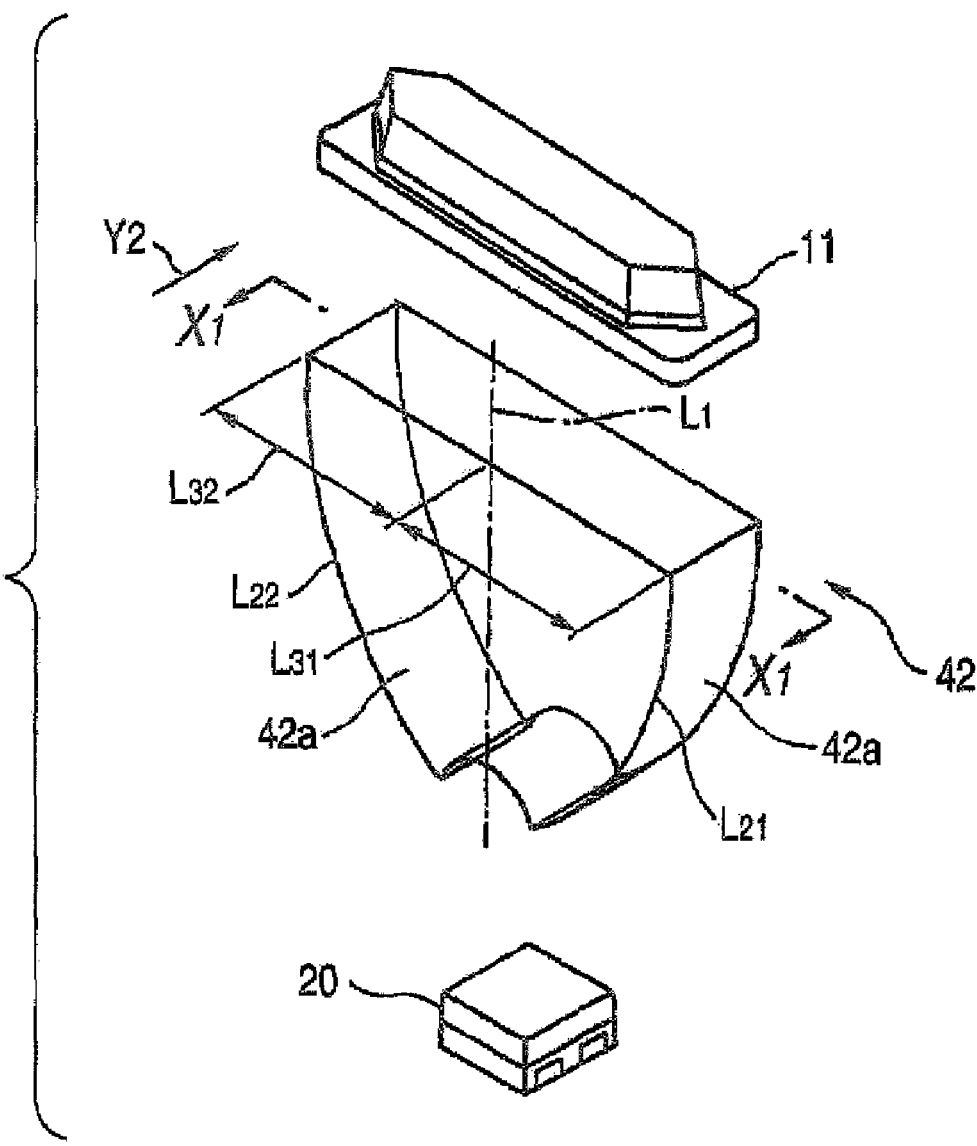
FIG. 2 is a perspective view illustrating a light collection lightguide 42 of the first embodiment.

Next, the detailed shape of the light collection lightguides 42 to be inserted into the through holes 41a are described hereinbelow with reference to FIGS. 2, 3A and 3B. FIG. 2 is a perspective view illustrating the light collection lightguides 42. FIG. 3A is a side view illustrating the display lightguides 11, the light collection lightguides 42 and the LEDs 20, which are shown in FIG. 2. FIG. 3B is a front view illustrating the light collection lightguide 42 and the display lightguides 11.

As shown in FIG. 2, a part of the outer face of the light collection lightguide 42 is formed like a parabolic face. The outer face shaped like a parabolic face is a light reflection face 42a. The shape of the light reflection face 42a is described as follows. First, as illustrated in FIGS. 2 and 3A, it is assumed that the parabolic face has a section including a parabola $L_{21}$ and $L_{22}$ whose axis is $L_1$. As shown in FIG. 3A, it is also assumed that the distance $L_{31}$ between the axis $L_1$ and an end of the parabola $L_{21}$ and the distance $L_{32}$ between the axis $L_1$ and an end of the parabola $L_{22}$ are longer than the maximum distances $L_{41}$ and $L_{42}$ among the distances from the center in the longer-side direction of the segment to ends in the same direction thereof.

The light reflection face 42a has the same shape as that of a face obtained by moving the parabola $L_{21}$ and $L_{22}$ in a direction Y2 perpendicular to a surface formed by the parabola $L_{21}$ and $L_{22}$ and the axis $L_1$ without changing the shape of the parabola $L_{21}$ and $L_{22}$ by a width W (see FIG. 3B) in the shorter-side direction of the segment.

As shown in FIG. 3A, the display lightguide 11 is disposed in front of the light collection lightguide 42 so that the shorter-side direction of the segment coincides with the direction Y2 in which the parabola $L_{21}$ and $L_{22}$ is moved, and that the rear face of the display lightguide 11 is perpendicular to the axis $L_1$. The light collection lightguide 42 is placed so that the light reflection face 42a covers the entire rear face of the segment when viewed from the front thereof.

The light collection portion 40 is provided with a flange 43 having a screw hole, as shown in FIG. 1. A screw hole provided in this flange 43 is aligned with a screw hole 31 provided in the substrate 30. Then, the light collection portion 40 is fixed to the substrate 30 by being screwed. Subsequently, the LEDs 20 are disposed at focal points of the parabola $L_{21}$ and $L_{22}$ included in sections of the reflection faces 42a of the light collection lightguides 42, which is provided in the light collection portion 40, one by one. Consequently, the light collection portion 40 can be fixed to the substrate 30 in a state in which two of the LEDs 20 are placed behind the through hole 41b. Thus, the LEDs 20 can easily be attached to the rear face of the light collection portion 40 only by fixing the light collection portion 40 to a predetermined place on the substrate 30. Consequently, the assembly of the display is facilitated.

The blocking plate 60 is formed like a cover for covering the light collection portion 40, and can be fixed to the light collection portion 40 by engaging holes 62 with convex portions 44 provided on the light collection portion 40, respectively, during a state in which the light diffusion plate 50 and the display lightguides 11 are sandwiched between the blocking plate 60 and the light collection portion 40.

Figure 4A:
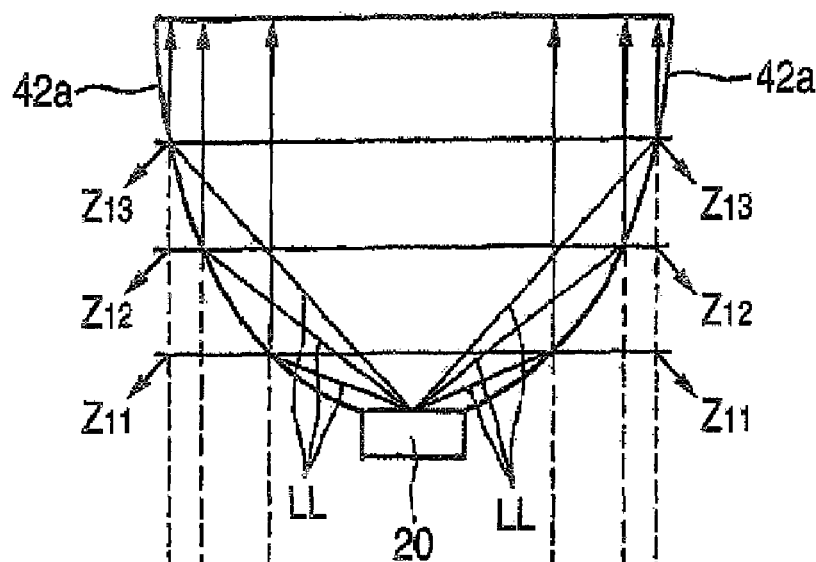
FIG. 4A is a sectional view illustrating the light collection lightguide 42, which is taken along line $X_1$-$X_1$ shown in FIG. 2.
Figure 4B:
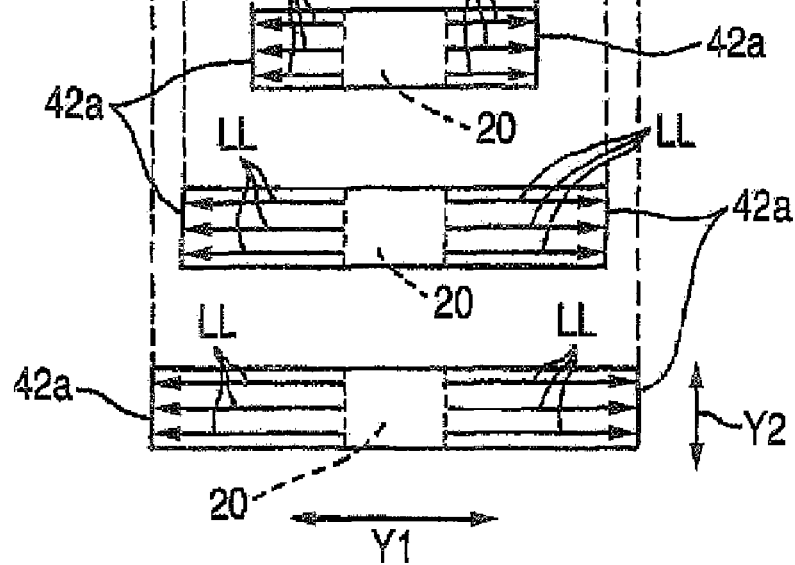
FIG. 4B shows a sectional view illustrating the light collection lightguide 42, which is taken along line $Z_{11}$-$Z_{11}$ shown in FIG. 4A, another sectional view illustrating the light collection lightguide 42, which is taken along line $Z_{12}$-$Z_{12}$ shown therein, and another sectional view illustrating the light collection lightguide 42, which is taken along line $Z_{13}$-$Z_{13}$ shown therein.

An operation of the display of the configuration is described hereinbelow by referring to FIGS. 4A and 4B. FIG. 4A is a sectional view illustrating the light collection lightguide 42, which is taken along line $X_1$-$X_1$ shown in FIG. 2. FIG. 4B shows a sectional view illustrating the light collection lightguide 42, which is taken along line $Z_{11}$-$Z_{11}$ shown in FIG. 4A, another sectional view illustrating the light collection lightguide 42, which is taken along line $Z_{12}$-$Z_{12}$ shown therein, and another sectional view illustrating the light collection lightguide 42, which is taken along line $Z_{13}$-$Z_{13}$ shown therein.

First, when the LEDs 20 are turned on, light emitted from the LEDs 20 is transmitted by the light collection lightguide 42 provided in the light collection portion 40.

In the case that each of the LEDs 20 is disposed at a focal point of the parabola $L_{21}$ and $L_{22}$ included in a section of the associated light reflection face 42a, as illustrated in FIG. 4A, light LL, which is emitted from the associated LED 20 and transmitted by the light collection lightguide 42 and impinges upon the light reflection face 42a, is reflected by the light reflection face 42a and can be output almost in parallel with the axis $L_1$, that is, in a direction nearly perpendicular to the rear face of the associated display lightguide 11.

Meanwhile, in the case where the width W in the shorter-side direction of the segment is smaller than or nearly equal to that of the associated LED 20, the light LL emitted from the associated LED 20 impinges upon the light reflection face 42a in the longer-side direction when viewed from the front thereof, as illustrated in FIG. 4B. As described above, the light reflection surface 42a is formed in such a way as to have a shape that is the same as a surface formed by moving a parabola $L_{21}$ and $L_{22}$ in and $L_{22}$ in a direction Y2 perpendicular to a surface formed by the parabola $L_{21}$ and $L_{22}$ and an axis $L_1$ without changing the shape of the parabola $L_{21}$ and $L_{22}$.

Therefore, in the case where the display lightguide 11 is disposed in front of the light collection lightguide 42 so that the shorter-side direction of the segment coincides with the direction Y2 in which the parabola $L_{21}$ and $L_{22}$ is moved, and that the rear face of the display lightguide 11 is perpendicular to the axis $L_1$. as described above, a given section of the light reflection face 42a, which is obtained by cutting thereof along a plane that is parallel with the rear face of the display lightguide 11, is perpendicular to the longer-side direction Y1. Thus, the light LL, which is emitted from the LED 20 in the longer-side when viewed from the front thereof, travels just to the front thereof without shifting toward the shorter side after reflected by the light reflection face 42a. That is, the light LL can be emitted in a direction perpendicular to the rear face of the display lightguide 11.

Therefore, light can be emitted in a direction perpendicular to parts, for example, both end portions in the longer-side direction of the display character shaped on the display lightguide 11, which are not located just in front of the LED 20. Even when a point light source, such as the LED 20 is used, the entire display character shaped on the display lightguide 11 in three dimensions can uniformly emit light.

Additionally, because the light collection portion 40 is formed of a light blocking member, light emitted from the LED 20 impinges from a rear-face-side opening portion of the associated through hole 41a thereinto does not leak to the outside thereof. This light is output only from a front-side opening portion of the through hole 41a. Thus, light emitted from the LED 20 can be prevented from being led to another segment that does not face the LED 20. Consequently, when the LED 20 is turned on, a segment other than the segment corresponding to the LED 20 can be prevented from emitting light.

As shown in FIG. 1, light emitted from the light collection portion 40 to the rear face of the display lightguide 11 is diffused by the light diffusion plate 50 provided between the display lightguide 11 and the light collection portion 40. Thus, light emitted from the LED 20 can be more uniformly output onto the display lightguide 11.

Among light rays output from the display lightguide 11 to the front thereof, light rays output from a part, on which the segment is shaped, are output to the front through the cutout portion of the blocking plate 60. On the other hand, light output from a portion other than the part, on which the segment is shaped, is blocked by the blocking plate 60. Thus, the contrast between the part, on which the segment is shaped, and the remaining part can be increased.

Second Embodiment

Figure 5:
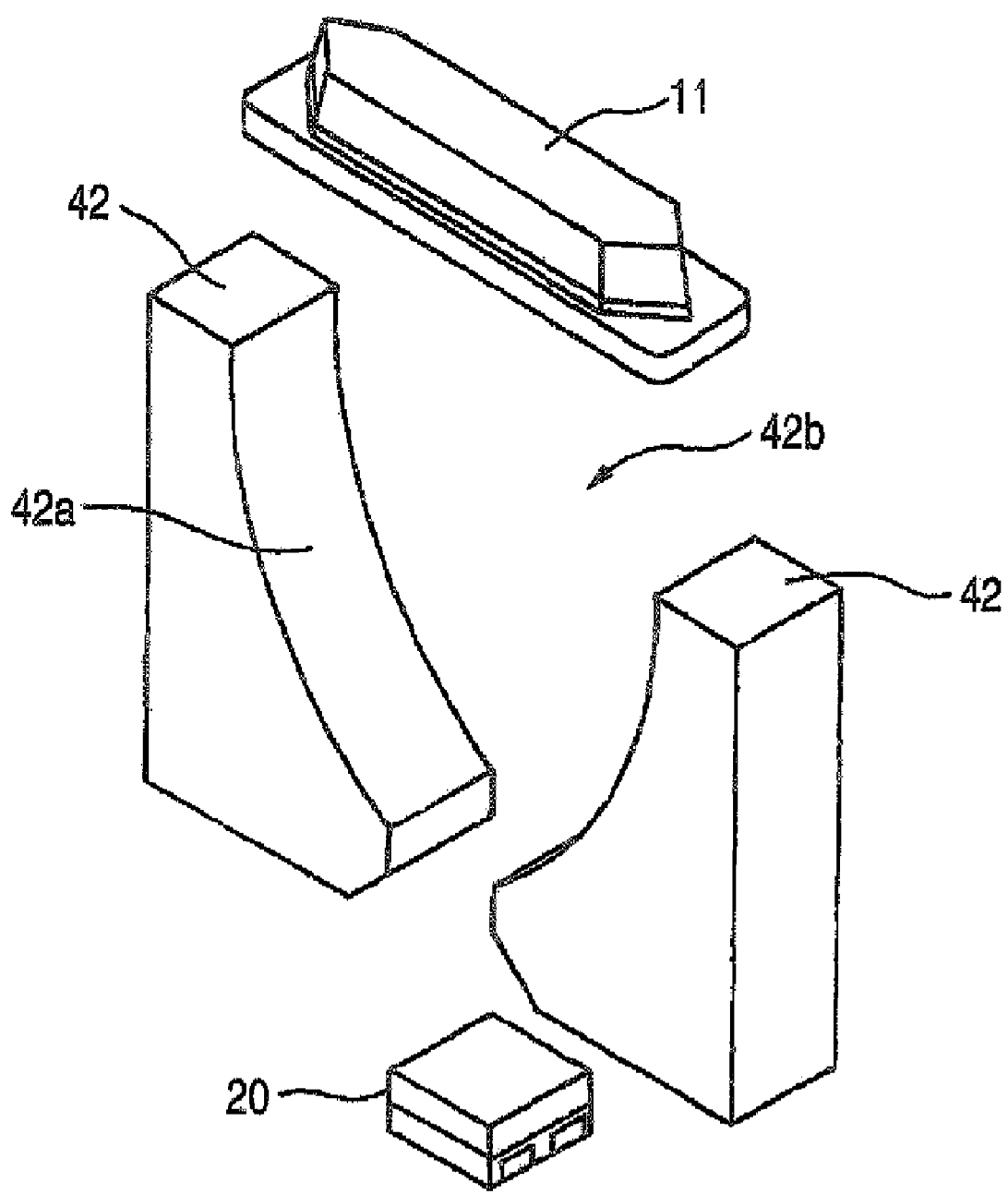
FIG. 5 is a perspective view illustrating a light collection lightguide 42 of a second embodiment of the invention.

Incidentally, in the first embodiment, the light reflection face 42a is provided by forming the outer face of the light collection lightguide 42 like a parabolic face as illustrated in FIG. 2. However, it is devised that a groove 42b is provided in the light collection lightguide 42, as illustrated in, for instance, FIG. 5, and that an inner face, in which the groove 42b is provided, is formed like a parabolic face to thereby provide the light reflection face 42a. In this case, when reflection processing is performed on the light reflection face 42a, an amount of light output onto the rear surface of the light collection lightguide 42 is increased still more, so that the luminance of the segment increases.

Third Embodiment

In the first embodiment, the light reflection face 42a is placed in such a way as to cover the entire segment formed on the display lightguide 11, as illustrated in FIG. 3B. Thus, as illustrated in FIG. 3A, the distance $L_{31}$ between the axis $L_1$ and an end of the parabola $L_{21}$ and the distance $L_{32}$ between the axis $L_1$ and an end of the parabola $L_{22}$ are longer than the maximum distances $L_{41}$ and $L_{42}$ among the distances from the nearly center in the longer-side direction of the segment to ends in the same direction thereof.

Figure 6A:
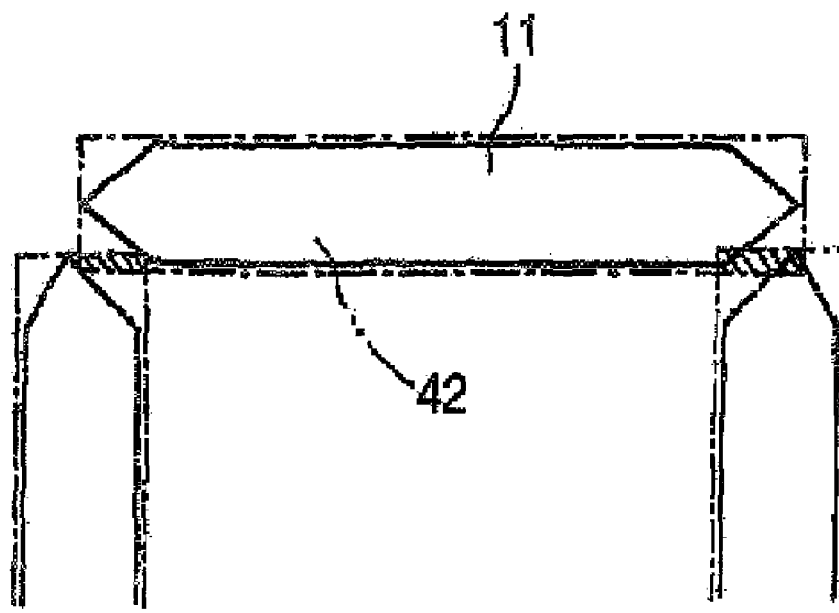
FIGS. 6A and 6B are views illustrating problems that occur in the first embodiment.

However, in the case of forming the light reflection face 42a in this way, a light reflection member is formed on a part (indicated by hatching in FIG. 3B) of the rear face of the display lightguide 11 other than the part, on which the segment is shaped. Therefore, in the case where the segments should be placed close to one another, the light reflection faces 42a placed on the rear faces of the segments interfere with one another, as indicated by hatching in FIG. 6A.

Figure 6B:
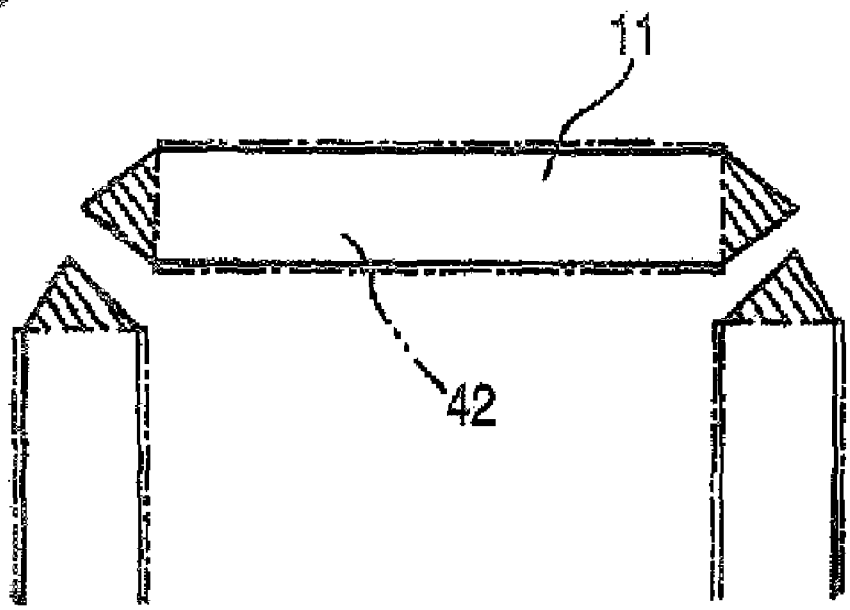

Thus, as illustrated in FIG. 6B, it is devised that the distance $L_{31}$ between the axis $L_1$ and an end of the parabola $L_{21}$ and the distance $L_{32}$ between the axis $L_1$ and an end of the parabola $L_{22}$ are set to be nearly equal to the minimum distance to thereby prevent the light reflection faces 42a from interfering with one another.

Figure 7A:
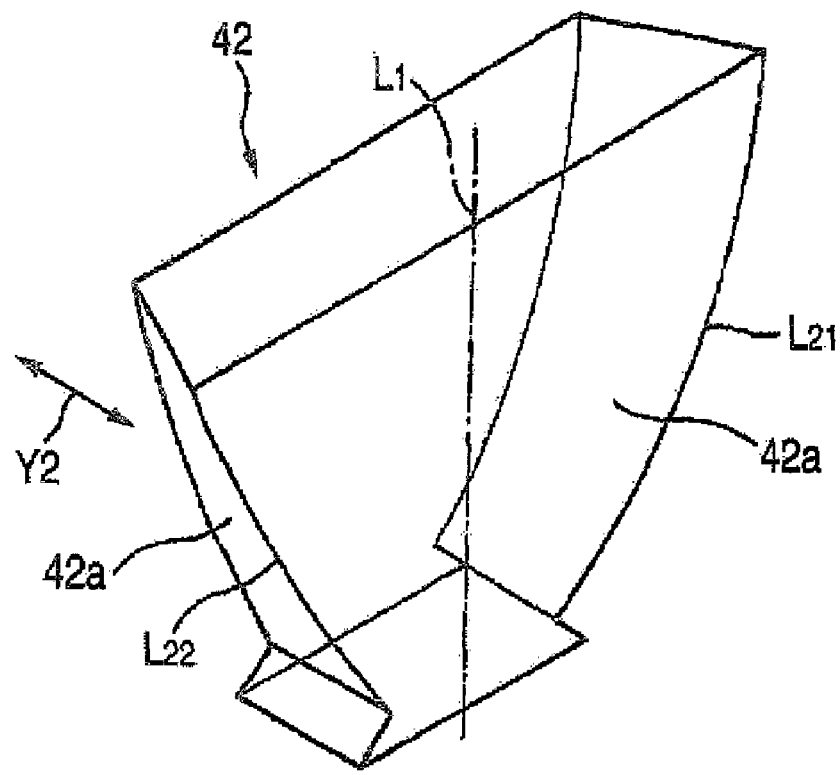
FIG. 7A is a perspective view illustrating a light collection lightguide 42 of a third embodiment of the invention.
Figure 7B:
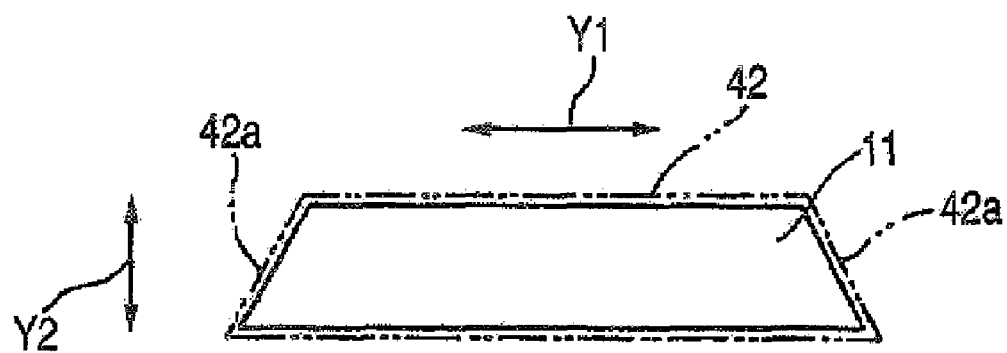
FIG. 7B is a front view illustrating a display lightguide 11 and the light collection lightguide 42 in the third embodiment.

However, in this case, the light reflection face 42a cannot be provided on the rear face of the hatched part of the display lightguide 11. Thus, there is a fear that the hatched part becomes dark. Then, it is devised that the light reflection face 42a having a shape as illustrated in FIGS. 7A and 7B is provided. FIG. 7A is a perspective view illustrating the light collection lightguide 42 of the third embodiment of the invention. FIG. 7B is a front view illustrating the display lightguide 11 and the light collection lightguide 42 in the third embodiment.

It is assumed that as illustrated in these figures, there is a parabola $L_{21}$ and $L_{22}$ whose axis of symmetry $L_1$ is a line perpendicular to the rear face of the display lightguide 11. The light reflection face 42a has the same shape as that of a face formed when the parabola $L_{21}$ and $L_{22}$ are moved by simultaneously and continuously changing the gradient of the parabola $L_{21}$ and $L_{22}$ in a direction Y2 perpendicular to a surface formed by the parabola $L_{21}$ and $L_{22}$ and the axis $L_1$ by a width W (see FIG. 3B) in the shorter-side direction of the segment so that a shape drawn by each of ends of the parabola $L_{21}$ and $L_{22}$ almost coincides with that of each of the longer-side ends of the segment.

The display lightguide 11 is disposed in front of the light collection lightguide 42 so that the shorter-side direction of the segment coincides with the direction Y2 in which the parabola $L_{21}$ and $L_{22}$ is moved, and that the rear face of the display lightguide 11 is perpendicular to the axis $L_1$. As illustrated in FIG. 7B, the light collection lightguide 42 is placed so that both ends of the parabola $L_{21}$ and $L_{22}$ are positioned just under the ends in the longer-side direction of the segment when viewed from the front thereof.

With the configuration, the light reflection face 42a is prevented from being placed on a part other than the portion, on which the segment is shaped, while the light reflection face 42a is disposed on each of the rear faces of the end portions in the longer-side direction of the segment. Thus, the end portions of the segment are prevented from becoming dark. Moreover, the light reflection faces 42a respectively corresponding to the segments are prevented from interfering with one another even when the plurality of the segments are placed close to one another.

Fourth Embodiment

In the third embodiment, each of the light reflection faces 42a is adapted to have the same shape as that of a face formed by moving the parabola $L_{21}$ and $L_{22}$ in such a way as to continuously change the gradient of the parabola. However, a given section of the light reflection face 42a, which is obtained by cutting thereof along a plane that is parallel with the rear face of the display lightguide 11, is not perpendicular to the longer-side direction Y1.

Therefore, light emitted from each of the LEDs 20 toward the longer-side direction of the segment when viewed from the front thereof is shifted to the shorter side of the segment after reflected by the light reflection face 42a. Thus, the light emitted from each of the LEDs 20 does not travel just to the front thereof. That is, light cannot be emitted therefrom in a direction perpendicular to the rear face of the associated display lightguide 11. Consequently, the third embodiment has encountered a problem in that the luminance of each of the segments is low when viewed from the front thereof.

Figure 8A:
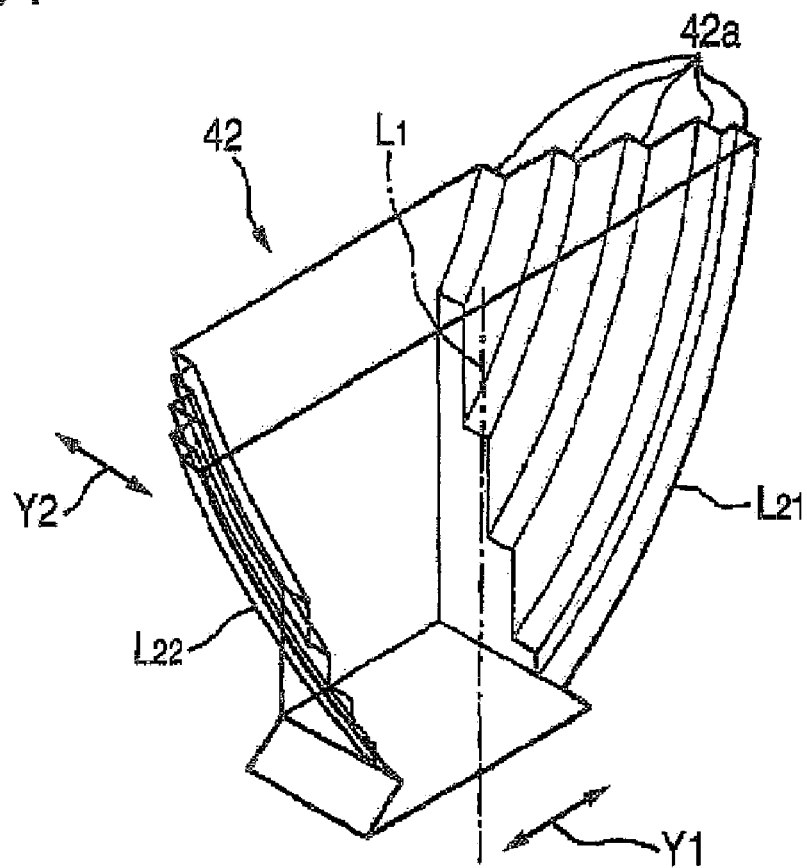
FIG. 8A is a perspective view illustrating a light collection lightguide 42 of a fourth embodiment of the invention.
Figure 8B:
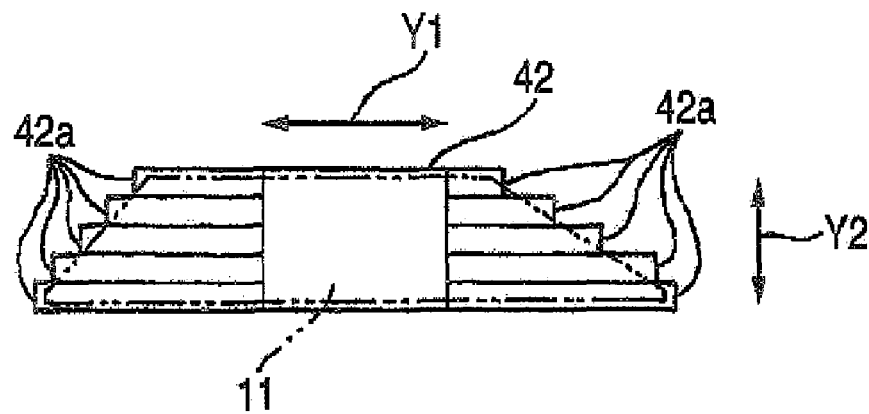
FIG. 8B is a front view illustrating a display lightguide 11 and the light collection lightguide 42 in the fourth embodiment.

Then, it is devised that the light reflection face 42a having a shape as illustrated in FIGS. 8A and 8B is provided. FIG. 8A is a perspective view illustrating the light collection lightguide 42 of the fourth embodiment of the invention. FIG. 8B is a front view illustrating the display lightguide 11 and the light collection lightguide 42 in the fourth embodiment.

That is, in the third embodiment, each of the light reflection faces 42a is adapted to have the same shape as that of a face formed by moving the parabola $L_{21}$ and $L_{22}$ in the direction of an arrow Y2 in such a way as to continuously change the gradient of the parabola. In contrast with this, in the fourth embodiment, each of the light reflection faces 42a is adapted to have the same shape as that of a face formed by moving the parabola $L_{21}$ and $L_{22}$ in the direction of the arrow Y2 in such a way as to intermittently change the gradient of the parabola, as illustrated in FIGS. 8A and 8B.

Incidentally, similarly to the third embodiment, the gradient of the parabola $L_{21}$ and $L_{22}$ is changed in the fourth embodiment so that a shape drawn by each of ends of the parabola $L_{21}$ and $L_{22}$ during the movement thereof almost coincides with that of each of the longer-side ends of the segment. Moreover, similarly to the third embodiment, the display lightguide 11 is disposed in front of the light collection lightguide 42 in the fourth embodiment so that the shorter-side direction of the segment coincides with the direction Y2 in which the parabola $L_{21}$ and $L_{22}$ is moved, and that the rear face of the display lightguide 11 is perpendicular to the axis $L_1$. As illustrated in FIG. 8B, the light collection lightguide 42 is placed in the fourth embodiment so that both ends of the parabola $L_{21}$ and $L_{22}$ are positioned just under the ends in the longer-side direction of the segment when viewed from the front thereof.

Similarly to the case of moving the parabola $L_{21}$ and $L_{22}$ without changing the shape of the parabola $L_{21}$ and $L_{22}$ by intermittently changing the gradient of the parabola $L_{21}$ and $L_{22}$ as described above, a given section of the light reflection face 42a, which is obtained by cutting thereof along the plane that is parallel with the rear face of the display lightguide 11, is perpendicular to the longer-side direction Y1. Thus, the light, which is emitted from the LED 20 in the longer-side direction Y1 in the longer-side when viewed from the front thereof, travels just to the front thereof without shifting toward the shorter side after reflected by the light reflection face 42a. That is, the light can be emitted in a direction perpendicular to the rear face of the display lightguide 11.

Similarly to the third embodiment, the fourth embodiment prevents the light reflection face 42a from being placed on a part other than the portion, on which the segment is shaped, while the light reflection face 42a is disposed on each of the rear faces of the end portions in the longer-side direction of the segment.

Fifth Embodiment

Figure 9:
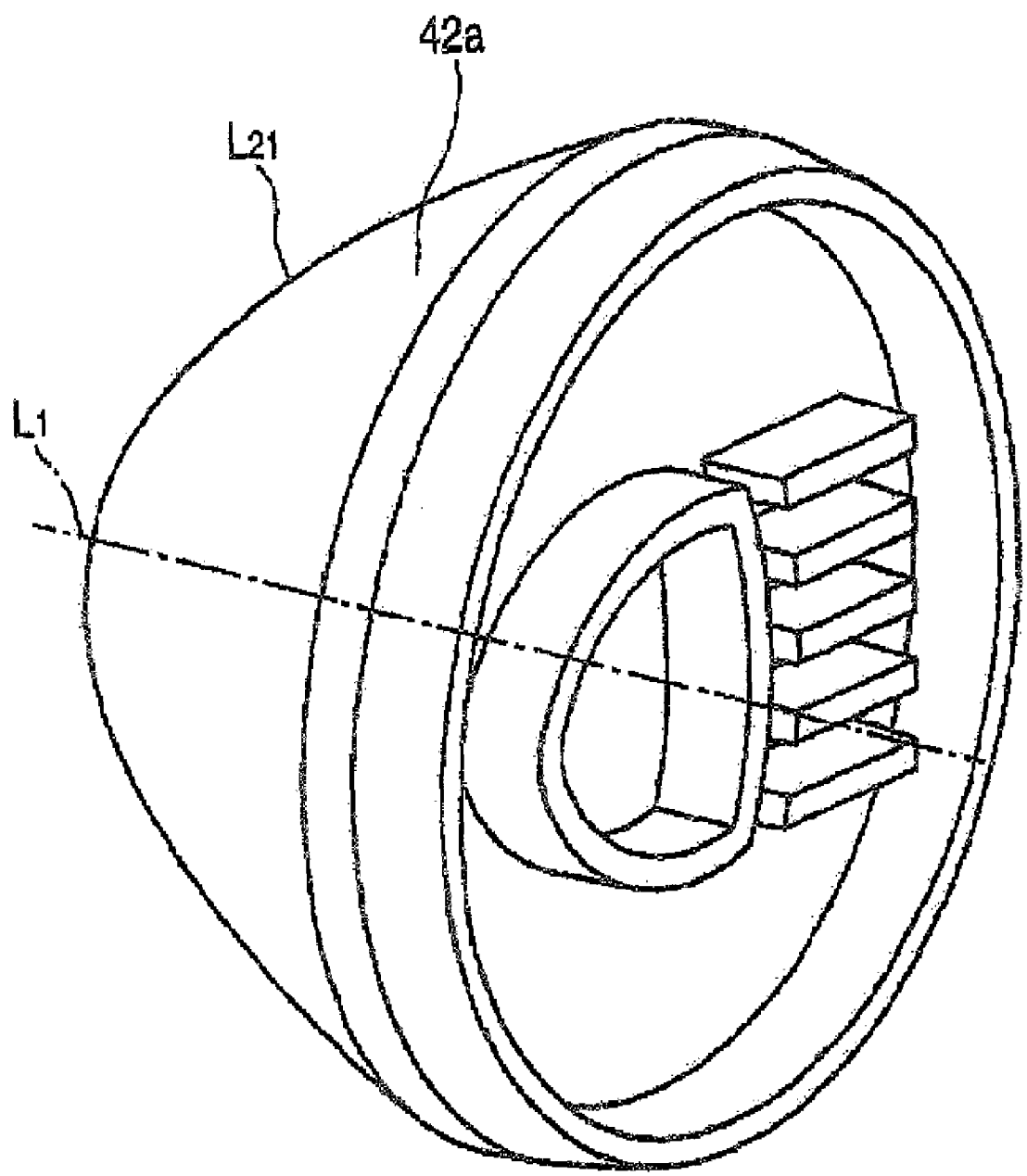
FIG. 9 is a perspective view illustrating a display according to a fifth embodiment of the invention.

In the first to fourth embodiments, display segments are used as display characters. Moreover, the light reflection face 42a is formed in such a way as to have the same shape as that of a face formed by moving the parabola $L_{21}$ and $L_{22}$ in the direction of the arrow Y2. However, when display characters indicating a high beam mode as illustrated in FIG. 9 are used, a light reflection face 42a having the same shape as that of a face formed by rotating the parabola $L_{21}$ around the axis $L_1$ may be used.

Sixth Embodiment

Figure 10:
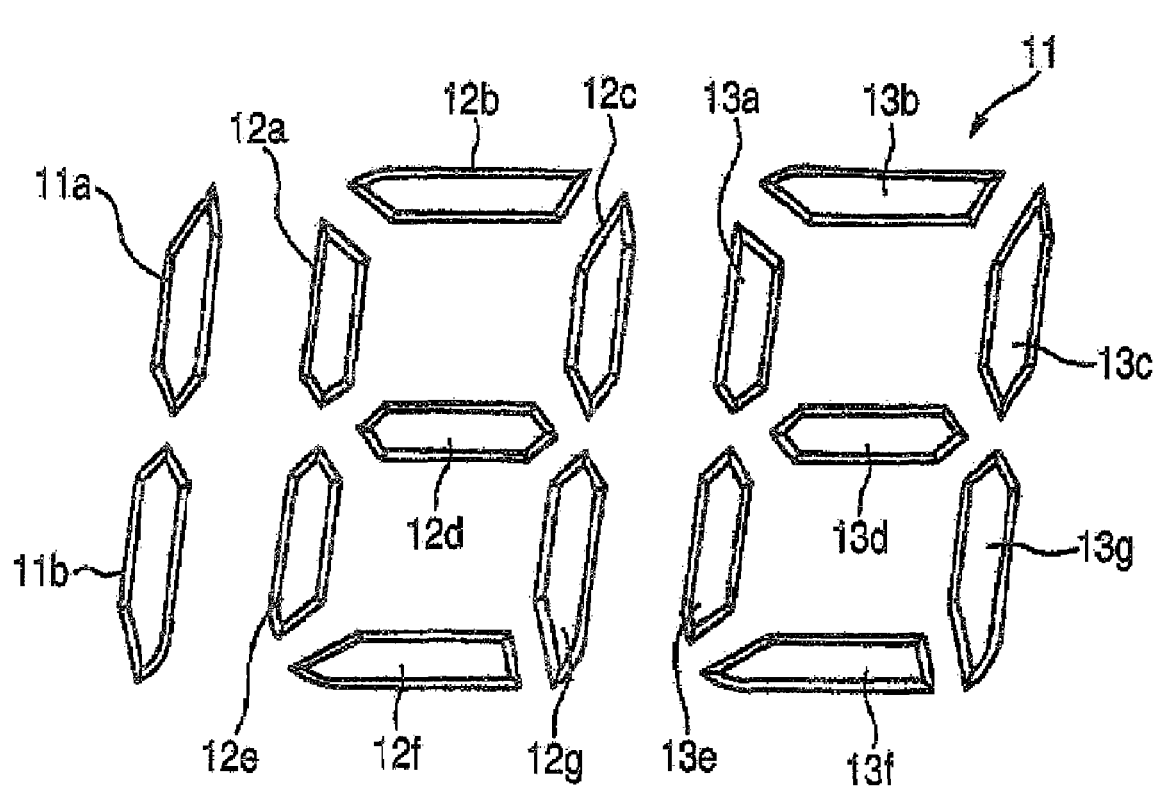
FIG. 10 is a partial front view illustrating a display lightguide 11 shown in FIG. 1.

Next, the details of the display lightguide 11 are described hereinbelow with reference to FIG. 10. FIG. 10 is a partial front view illustrating the display lightguide 11. As illustrated in this figure, two segments 11a and 11b are apposed in the longitudinal direction and constitute a numeral "1". Seven segments 12a to 12g are disposed in such a way as to constitute a numeral "8". Concretely, four 12a to 12d of the seven segments 12a to 12g are arranged on four sides surrounding a square space. Similarly, the remaining three segments 12e to 12g and the segment 12d are arranged on four sides surrounding a square space. Seven segments 13a to 13g are arranged similarly to the segments 12a to 12g and constitute a numeral "8".

Figure 11:
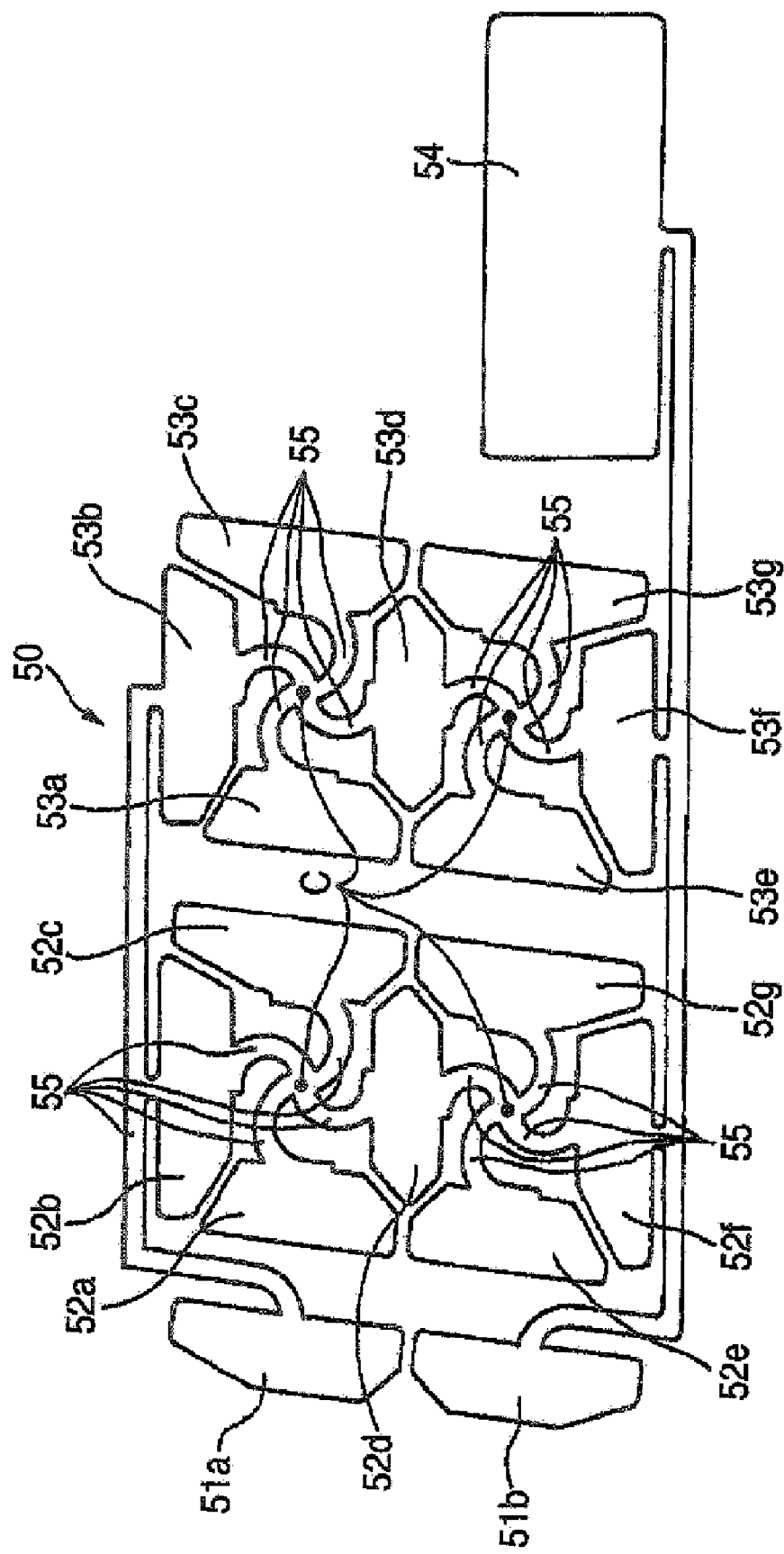
FIG. 11 is a front view illustrating a light diffusion plate 50 shown in FIG. 1.

Next, the detailed shape of a light diffusion plate 50 to be placed behind the display lightguide 11 is described hereinbelow with reference to FIG. 11. FIG. 11 is a front view illustrating the light diffusion plate 50. The light diffusion plate 50 has diffusion portions 51a and 51b to be respectively disposed behind the segments 11a and 11b, diffusion portions 52a to 52g to be respectively disposed behind the segments 12a to 12g, diffusion portions 53a to 53g to be respectively disposed behind the segments 13a to 13g, a diffusion portion 54 to be placed in such a way as to cover the rear face of the display lightguide 11 indicating characters "km/h", and a connection portion for connecting the diffusion portions 51a, 51b, 52a to 52g, 53a to 53g, and 54 to one another.

The arrangement of the diffusion portions 52a to 52g is similar to that of the segments 12a to 12g. Four 52a to 52d of the seven diffusion portions 52a to 52g are arranged on four sides surrounding a square space. Similarly, the remaining three diffusion portions 52e to 52g and the diffusion portion 52d are arranged on four sides surrounding a square space.

The connection portion 55 for connecting the diffusion portions 52a to 52d is curve-formed. More particularly, the connection portion 55 is formed in such a manner as to extend from the nearly center C of a space, which is surrounded by the four diffusion portions 52a to 52d, to each of the diffusion portions 52a to 52d so as to connect these diffusion portions. The connection portion 55 is formed in such a way as to have different curved parts respectively extending from the nearly center C to the diffusion portions 52a to 52d.

Similarly, the connection portion 55 for connecting the diffusion portions 52d to 52g is curve-formed. More particularly, the connection portion 55 is formed in such a manner as to extend from the nearly center C of a space, which is surrounded by the four diffusion portions 52d to 52g, to each of the diffusion portions 52a to 52g so as to connect these diffusion portions. The connection portion 55 is formed in such a way as to have different curved parts respectively extending from the nearly center C to the diffusion portions 52d to 52g. The diffusion portions 53a to 53g are connected to one another, similarly to the diffusion portions 52a to 52g. Therefore, the description of the connection among the diffusion portions 53a to 53g is omitted herein.

An operation of the display of the configuration is described hereinbelow. Now, when, for example, the LED 20 disposed behind the segment 12a is turned on, light emitted from this LED 20 impinges into the through hole 41a formed behind the segment 12a and in the light collection portion 40. The light having impinged into the through hole 41a is transmitted by the light collection lightguide 42. Subsequently, the light impinges directly upon the rear face of the diffusion portion 52a or impinges thereon after reflected by the parabolic faceal reflection face of the light collection lightguide 42. Because the light collection portion 41a is formed of a light blocking member, light emitted from the LED 20 disposed behind the segment 12a does not leak to the outside thereof.

The light having impinged to the rear face of the diffusion portion 52a is diffused to the entire diffusion portion 52a. Thereafter, the light impinges upon the rear face of the segment 12a, so that the segment 12a is illuminated. Incidentally, the connection portion 55 for connecting the diffusion portions 52a to 52d are formed like curved parts, as described above. Therefore, the light having impinged upon the rear face of the diffusion portion 52a neither propagates through the connection portion 55 nor impinges into the other diffusion portions 52b to 52d.

That is, even when the light diffusion plate 50 is integrally formed by connecting the plurality of the diffusion portions 51a, 51b, 52a to 52g, 53a to 53g, and 54 through the connection portion 55, so as to reduce the number of components and as to simplify the assembly of the display, light does not leak from a predetermined one of the diffusion portions to the other diffusion portions through the connection portion 55. Therefore, light emitted to the rear face of a predetermined one of the segments can be prevented from impinging upon the rear faces of the other segments.

The connection portions 55 are formed in such a way as to extend from the nearly center C of the space surrounded by the diffusion portions 53a to 53d to each of the diffusion portions 53a to 53d thereby to connect therebetween, and as to extend from that of the space surrounded by the diffusion portions 53d to 53g to each of the diffusion portions 53d to 53g thereby to connect therebetween. Consequently, the diffusion portions are connected to one another necessarily through the nearly center C. Thus, the length of the connection portion 55 can be set to be long. Hence, the invention can more reliably and certainly prevent leakage of light from a predetermined one of the diffusion portions to the other diffusion portions through the connection portion 55.

The connection portions 55 are formed in such a manner as to have different curved parts respectively extending from the nearly center C to each of the diffusion portions 53a through 53d and to each of the diffusion portions 53d through 53g. Thus, the curvature of each of the connection portions 55 can be increased. Consequently, leakage of light from a predetermined one of the diffusion portions to the other diffusion portions through the connection portion 55 can be more reliably and certainly prevented.

Figure 12:
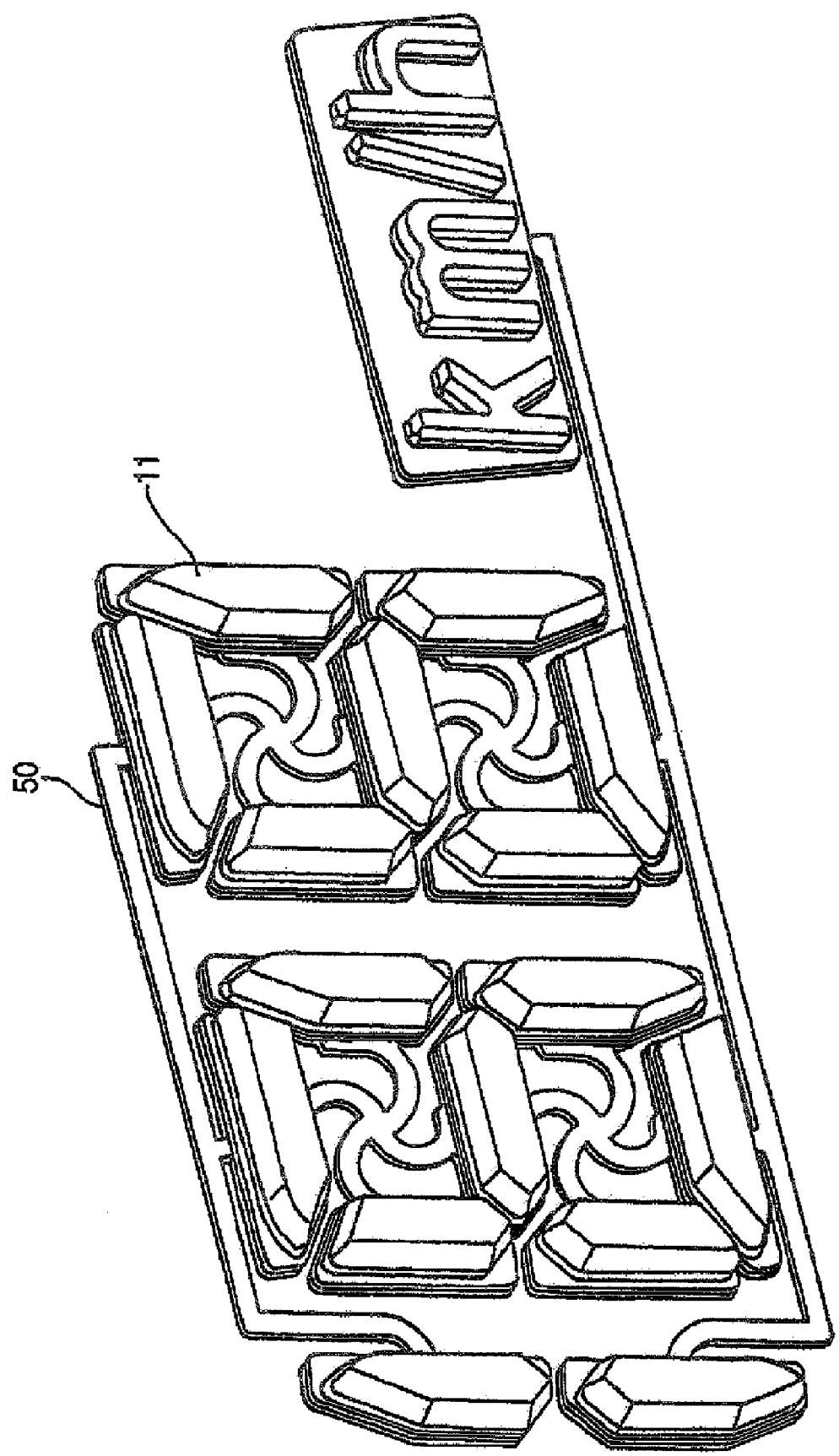
FIG. 12 is a perspective view illustrating the light diffusion plate 50 and the display lightguide 11, which are integrally formed.

Incidentally, although the light diffusion plate 50 and the display lightguides 11 are provided as separate parts in the sixth embodiment, the light diffusion plate 50 and the display lightguides 11 may be integrally formed, as shown in FIG. 12, thereby to reduce the number of components and to simplify the assembly of the display. A method for integrally forming the light diffusion plate 50 and the display lightguides 11 may be, for example, a film insert forming method for injecting a transparent resin serving as a forming agent, which is used for forming the display lightguides 11, into a die for the display lightguide 11 in a state, in which the light diffusion plate 50 is inserted into the die, in a case that the diffusion plate 50 is preliminarily formed by, for example, die-cutting.

Alternatively to the film insert, for example, a method of performing two-color molding by using both an opacifier serving as a forming agent for the light diffusion plate 50, and a transparent resin serving as a forming agent for the display lightguide 11 may be employed as the method for integrally forming the light diffusion plate 50 and the display lightguides 11.

Figure 13A:
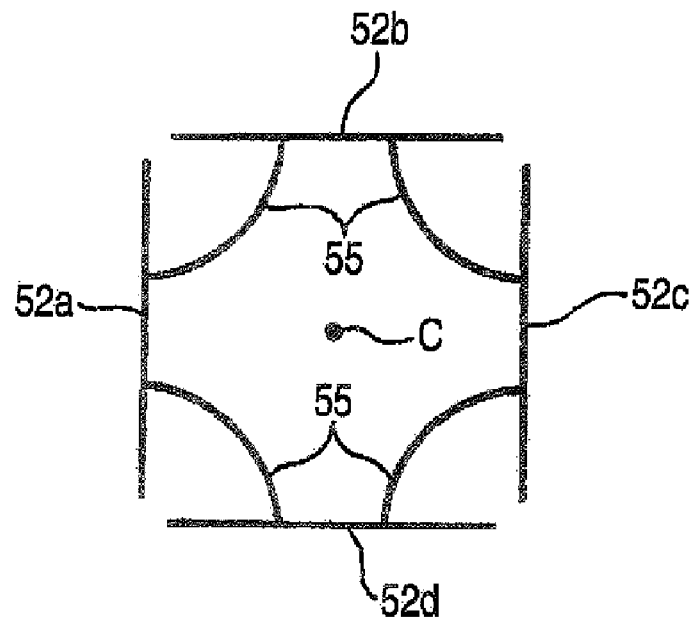
FIGS. 13A and 13B are views illustrating the shape of a connection portion 55 of a modification of the sixth embodiment.

In the sixth embodiment, as illustrated in FIG. 11, the connection portion 55 for connecting the diffusion portions 52a to 52d is formed in such a way as to extend from the nearly center C of a space surrounded by four 52a to 52d of the diffusion portions to each of the diffusion portions 52a to 52d so as to connect these diffusion portions. For example, the connection portion 55 may be formed in such a way as not to pass through the nearly center C, as illustrated in FIG. 13A. However, the connection portion 55 of the shape shown in FIG. 13A is short in length, as compared with the connection portion 55 of the shape shown in FIG. 11. Therefore, in the case where the space surrounded by the four diffusion portions 52a to 52d is narrow, the connection portion 55 of the shape shown in FIG. 11 is more preferable.

Figure 13B:
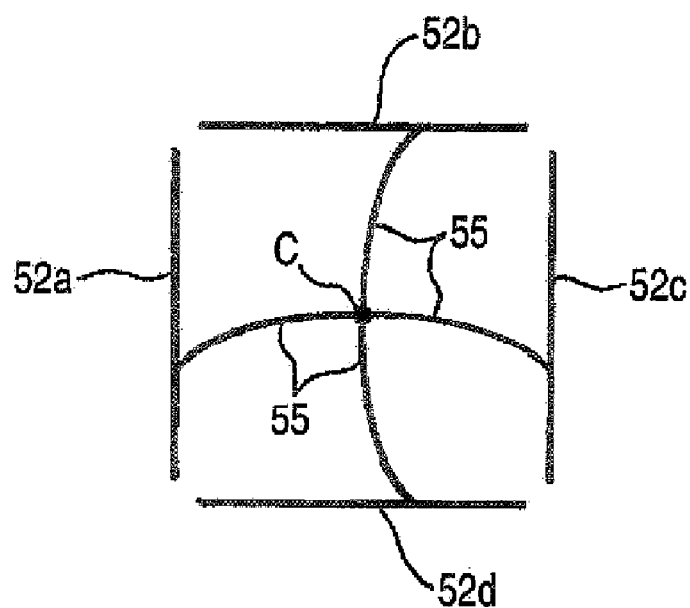

In the sixth embodiment, as illustrated in FIG. 11, the connection portions 55 for connecting the diffusion portions 52a to 52d is formed in such a manner as to have different curved parts respectively extending from the nearly center C to each of the diffusion portions 52a through 52d. For instance, it is devised that as illustrated in FIG. 13B, each of the connection portions 55 is formed in such a way as to have different curved parts for connecting the diffusion portions opposed to each other. However, the connection portion 55 of the shape shown in FIG. 13B is small in curvature, as compared with the connection portion 55 of the shape shown in FIG. 11. Thus, in the case where the space surrounded by the four diffusion portions 52a to 52d is narrow, the connection portion 55 of the shape shown in FIG. 11 is more preferable.

Seventh Embodiment

Figure 14:
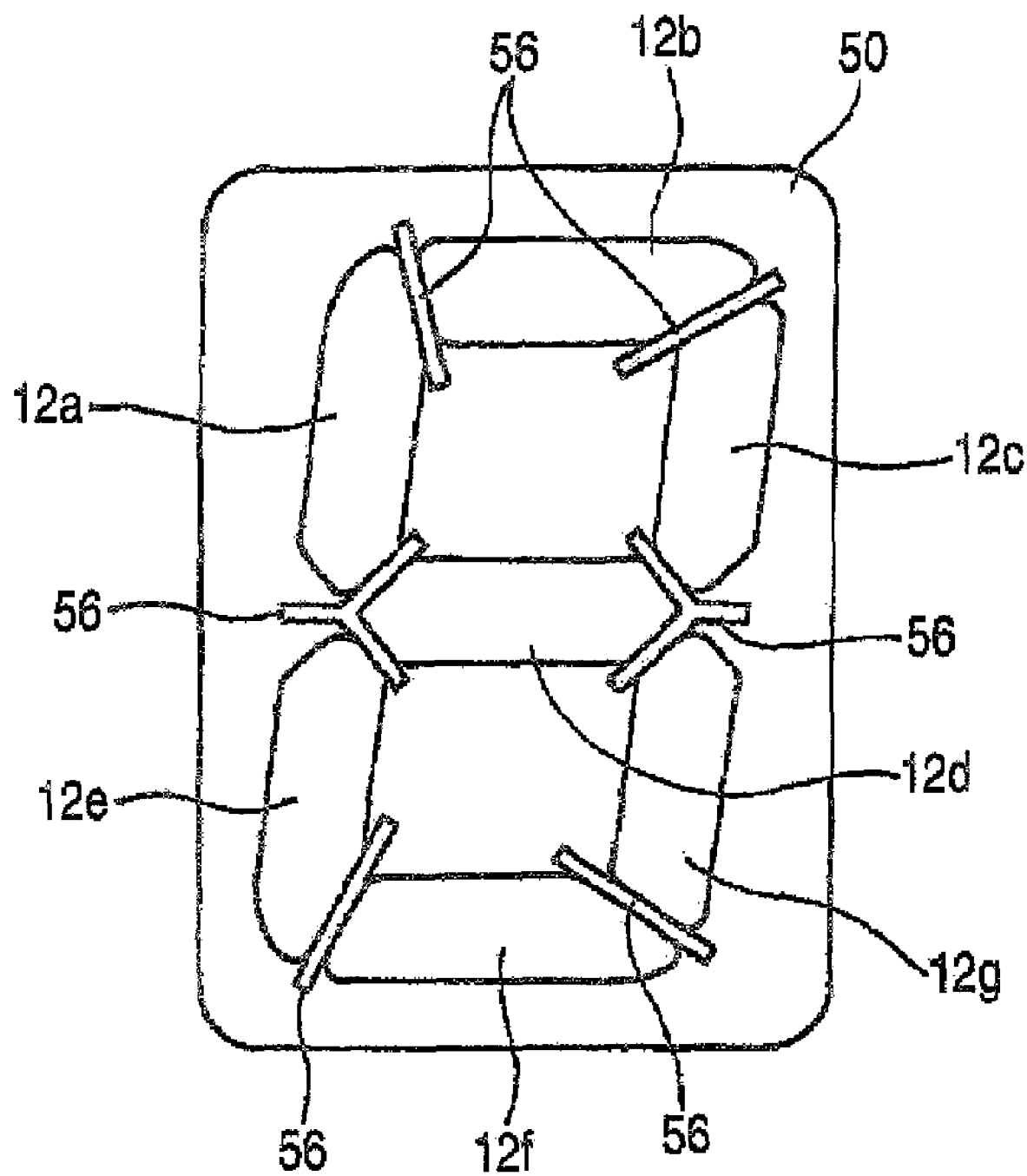
FIG. 14 is a front view illustrating a diffusion plate 50 and segments 12a to 12g of a seventh embodiment of the invention.

Incidentally, in the sixth embodiment, the light diffusion plate 50 comprises the plurality of the diffusion portions 51a, 51b, 52a to 52g, 53a to 53g, and 54, and the connection portions 55 for the diffusion portions. However, it is devised that as illustrated in FIG. 14, a light diffusion plate 50 is formed like a single plate adapted to cover all the rear faces of a plurality of segments 12a to 12g, and that a concave light blocking portion 56 is provided behind the border between each pair of adjacent ones of the segments.

Even in the case where the light diffusion plate 50 is formed like a single plate adapted to cover all the plurality of segments, the concave light blocking portions 56 provided in this way in the light blocking plate 50 shuts off light having impinged upon the rear face of the predetermined segment and prevents such light from impinging upon the rear faces of the other segments. In this case, the light diffusion plate 50 may be formed by the film insert forming method or the two-color molding method in such a manner as to be integral with the display lightguides 11. The light blocking portion 56 may be formed in such a way as to be convex.

Eighth Embodiment

Figure 15A:
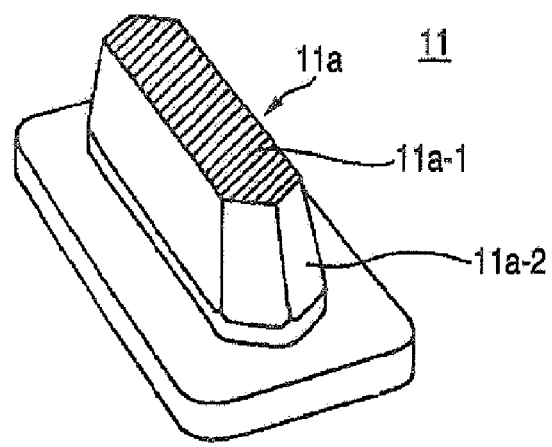
FIG. 15A is a perspective view illustrating a display lightguide 11 provided with a convex portion shaped into a three-dimensional display segment, which is taken from the front thereof.
Figure 15B:
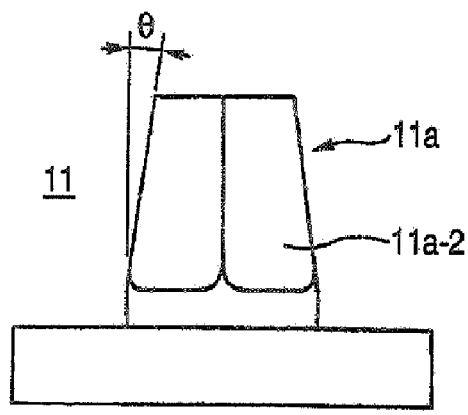
FIG. 15B is a side view illustrating the display lightguide 11.
Figure 15C:
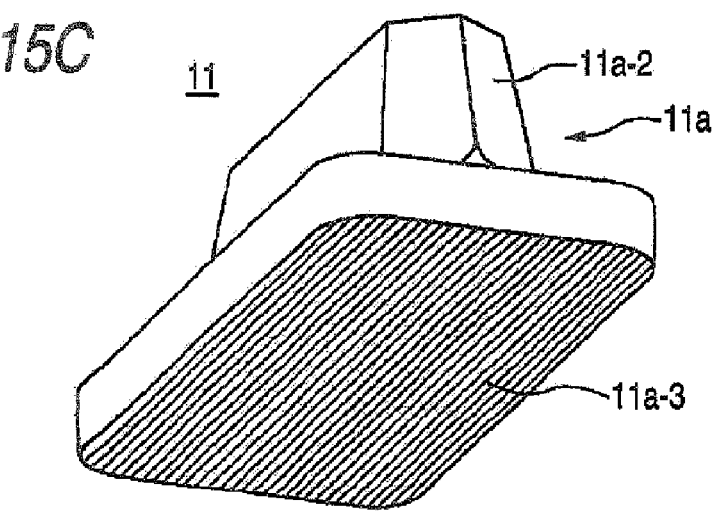
FIG. 15C is a perspective view illustrating the display lightguide 11, which is taken from the rear thereof.

Next, the details of the display lightguide 11 are described hereinbelow with reference to FIGS. 15A to 15C. FIG. 15A is a perspective view illustrating a display lightguide 11 provided with a convex portion shaped into a three-dimensional display segment, which is taken from the front thereof. FIG. 15B is a side view illustrating the display lightguide 11. FIG. 15C is a perspective view illustrating the display lightguide 11, which is taken from the rear thereof.

As illustrated in FIGS. 15A to 15C, the shape of the segment is formed on the top face 11a-1 of the convex portion 11a provided in the display lightguide 11. As illustrated in FIG. 15A, light diffusion processing is performed on the top face 11a-1. The light diffusion processing may include, for example, processing to preliminarily form crimps on the top face by using a mold, processing to form cracks therein, sandblast processing, and coating.

As illustrated in FIG. 15B, sides 11a-2 of the convex portion 11a are tapered off toward the top face 11a-1. Incidentally, a tapering angle ranges θ from 5° to 20°. As illustrated in FIG. 15C, light diffusion processing is performed on the bottom face 11a-3 that faces the top face 11a-1 of the convex portion 11a.

An operation of the display of the configuration is described hereinbelow. First, when the LED 20 is turned on, light emitted from the LED 20 impinges into the through holes 41a and 41b provided in front of the turned-on LED 20. The light having impinged into the through holes 41a and 41b is transmitted by the light collection lightguide 42. Subsequently, the light impinges directly upon the rear face of the diffusion plate 50 or impinges thereon after reflected by the parabolic faceal reflection face of the light collection lightguide 42. Because the light collection portion 40 are formed of light blocking members, light emitted from the LED 20 and made to impinge thereinto from rear-face-side opening portions provided therein does not leak to the outside of the through holes 41a and 41b.

The light having been incident upon the light diffusion plate 50 is diffused and subsequently, impinges upon the display lightguide 11 after diffused. The light having been incident upon the display lightguide 11 is diffused by the bottom face 11a-3 and the top face 11a-1. Thereafter, the light is output to the front of the display lightguide 11. Thus, the display lightguide 11 is illuminated.

As described above, a part of the top face 11a-1, on which the segment or the letter is shaped, is clearly illuminated and appears more three-dimensional by performing light diffusion processing on the top face 11a-1, on which the segment or the letter is shaped. Side faces 11a-2 of the convex portion 11a are tapered off toward the top face 11a-1 on which the segment or the letter is shaped. Thus, even when the top face 11a-1 is viewed from just above, the side faces 11a-2 of the convex portion 11a can be visually identified and have a more three-dimensional appearance.

The bottom face 11a-3 opposed to the top face 11a-1 of the convex portion 11a undergoes light diffusion processing. Therefore, light having impinged from the bottom face 11a-3 is diffused by the bottom face 11a-3. Thereafter, the light is uniformly incident upon the entire top face 11a-1. Thus, the part of the top face 11a-1, on which the segment serving as the display character is shaped, is clearly illustrated and looks more three-dimensional.

Incidentally, in the eighth embodiment, among the top face 11a-1 and the side faces 11a-2, light diffusion processing is performed only on the top face 11a-1. However, even when the light diffusion processing is performed only on the side faces 11a-2 thereamong, the border between the top face 11a-1 and each of the side faces 11a-2 can be clearly and visually identified. Thus, the segment or the letter can look more three-dimensional.

The light diffusion processing may be performed on, for instance, all the top face 11a-1 and the side faces 11a-2. In this case, the entire convex portion 11a is more clearly illuminated, so that the display character can appear more three-dimensional.

Ninth Embodiment

Figure 16:
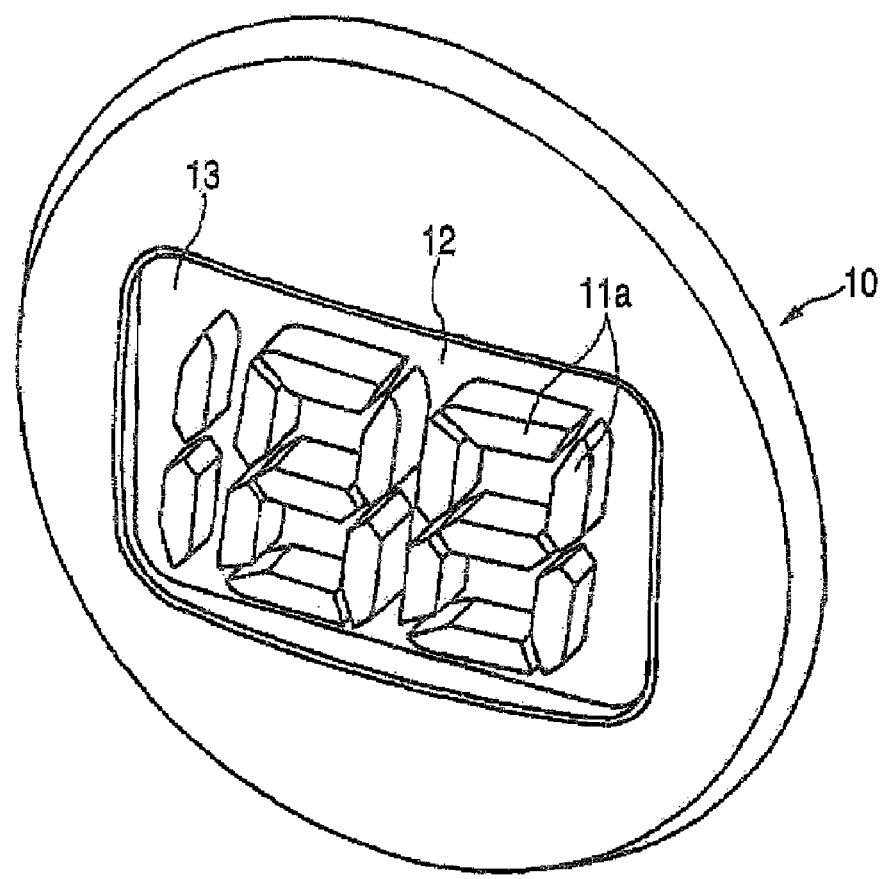
FIG. 16 is a perspective view illustrating a display portion 10 in a ninth embodiment of the invention.

In the eighth embodiment, the display lightguides 11 respectively corresponding to the segments are formed as different parts. However, in the case of forming such display lightguides 11 as different parts, the number of parts increases. The assembly of the display becomes troublesome. Thus, it is devised that for instance, as illustrated in FIG. 16, the rear-face-side side faces of a plurality of convex portions 11a provided on display lightguides 11 are connected by dark color lightguides 12 and formed in such a way as to be integral with one another. A method for integrally forming the display lightguides 11 may be a two-color molding method using a transparent forming agent for the display lightguides 11, and a forming agent for the dark lightguide 12.

With the configuration, the plurality of the display lightguides 11 are connected to each other and integrally formed. Even in such a case, light made to impinge upon the rear race of a predetermined display lightguide 11 is blocked and does not impinge upon the other display lightguides 11. Therefore, in the case that only the predetermined display lightguide 11 is illuminated, light is prevented from leaking to other display lightguides 11 placed near to the predetermined lightguide 11 and illuminating the other lightguides 11. Consequently, the ninth embodiment can improve design in displaying characters.

According to the ninth embodiment, as illustrated in FIG. 16, a concave portion 13 is provided in the display portion 10. The convex portion 13a is provided in the concave portion 13. This provision of the convex portion 13a in the concave portion 13 enables the display character shaped on the convex portion 11a to appear more three-dimensional.

Incidentally, in the ninth embodiment, the top face 11a-1 of the convex portion 11a is shaped into the display character, similarly to the eighth embodiment. That is, this display character is a two-dimensional one. However, as described in the foregoing description of the ninth embodiment, the integral forming of the plurality of the display lightguides 11 and the forming of the convex portion 11a in the concave portion 13 can be applied to cases that the display character is a three-dimensional one, and that the entire convex portion 11a is shaped into a display character.

In the eighth embodiment and the ninth embodiment, the display lightguides 11 are transparent. However, colored display lightguides may be used. In this case, even when achromatic light impinges upon the display lightguide 11, the display lightguide 11 can be illuminated with colored light.

Figure 17A:
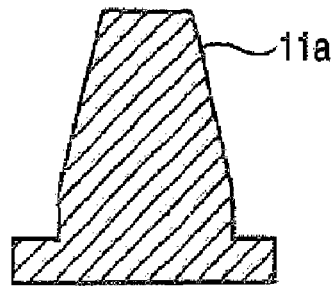
Figure 17B:
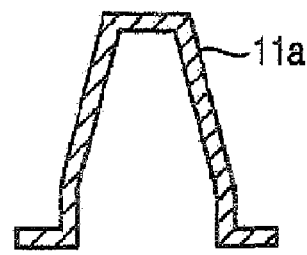
Figure 18:
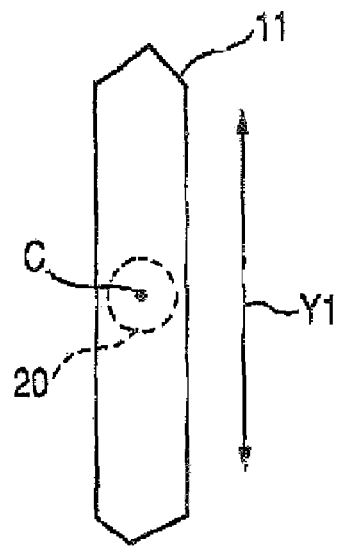
FIG. 18 is a view illustrating an example of a related display.
Figure 19A:
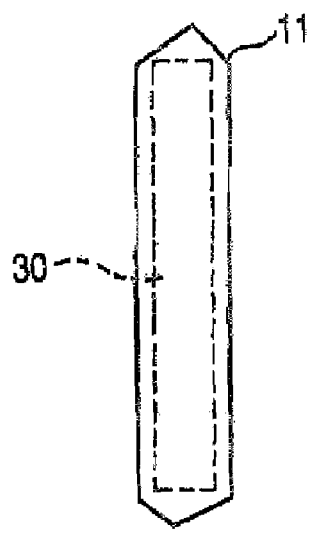
FIGS. 19A and 19B are views illustrating an example of a related display.
Figure 19B:
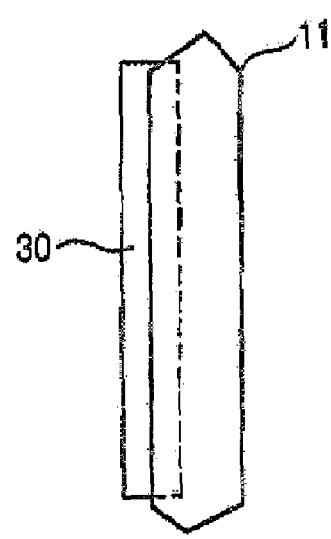
Figure 20A:
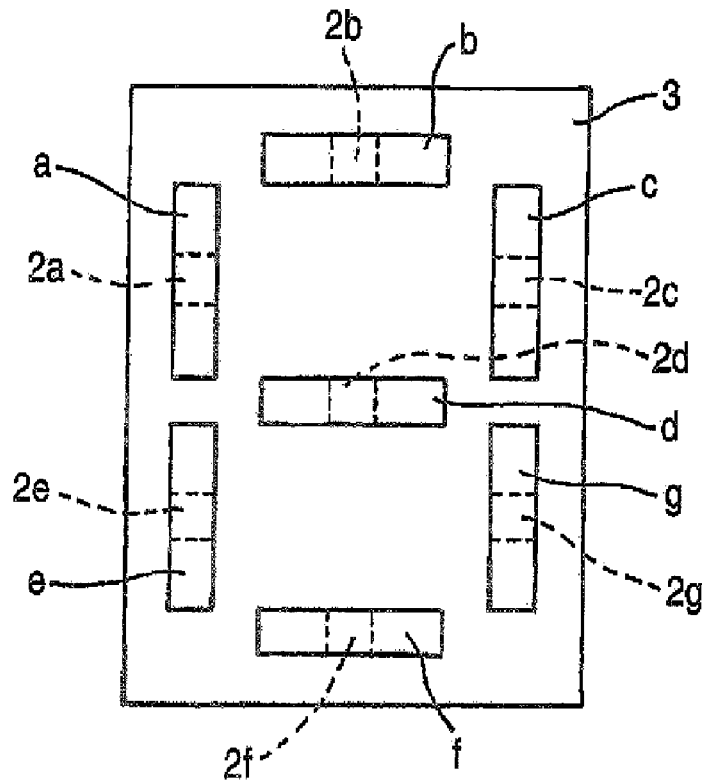
FIGS. 20A and 20B are front views each illustrating a related display.
Figure 20B:
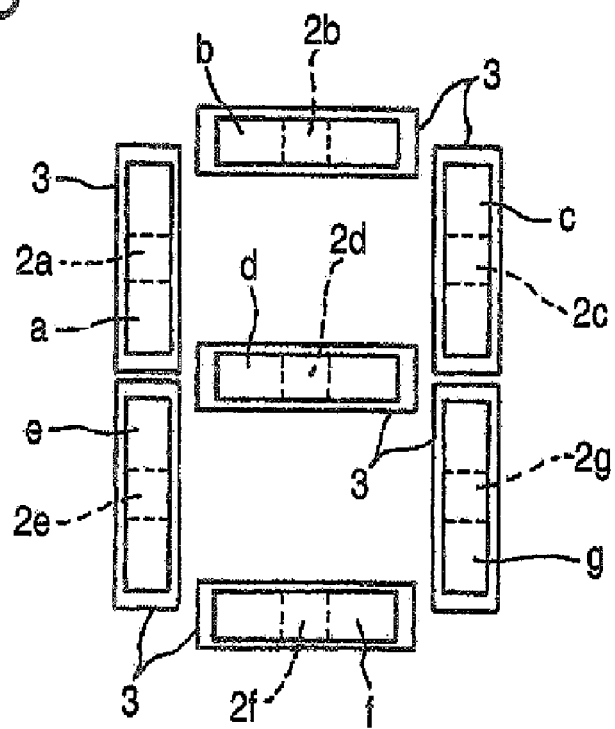

Although the convex portion 11a is formed like a prism in the eighth embodiment, as shown in FIG. 17A illustrating a sectional view of the convex portion 11a, the convex portion may be formed like a thin-walled hollow member as illustrated in, for instance, FIG. 17B.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A light diffusion member for diffusing a light to be irradiated into a display member, the display member having a plurality of display characters which are illuminated by the light, comprising:
    a plurality of light diffusion portions, disposed so as to correspond to the display characters; and
    a curved connection portion, connecting the diffusion portions to one another.

2. The light diffusion member as set forth in claim 1, wherein when at least four display segments are placed as the display characters on four sides surrounding a space, at least four diffusion portions is placed on four sides surrounding a space so as to respectively correspond to the four display segments; and
    wherein the curved connection portion is formed so as to extend from a nearly center of the space surrounded by the diffusion portions to each of the diffusion portions.

3. The light diffusion member as set forth in claim 1, wherein the display member has a plurality of display lightguides, each display lightguide having the display character formed in three dimensions; and
    wherein the light diffusion member is integrally formed with the display lightguides.

4. The light diffusion member as set forth in claim 3, wherein the light diffusion member is integrally formed with the display lightguides by injecting a forming agent for forming the display lightguides into a mold for the display lightguides, during a state in which the light diffusion member is inserted into the mold.

5. The light diffusion member as set forth in claim 3, wherein the light diffusion member is integrally formed with the display lightguides by two-color forming using a forming agent for forming the light diffusion member and a forming agent for forming the display lightguides.

6. The light diffusion member as set forth in claim 2, wherein the curved connection portion has a plurality of extending parts respectively extending from the nearly center to the diffusion portions; and
    wherein the extending parts have different curves respectively.

7. The light diffusion member as set forth in claim 1, wherein the plurality of light diffusion portions diffuse a light from a light source to be irradiated into the display member for illuminating the display characters.

8. The light diffusion member as set forth in claim 1, wherein each light diffusion portion of the plurality of light diffusion portions is a structure which covers a rear face of a respective display character.

9. The light diffusion member as set forth in claim 1, wherein each light diffusion portion of the plurality of light diffusion portions is a structure placed behind one of the plurality of display characters.

10. The light diffusion member as set forth in claim 9, wherein the light diffusion member is integrally formed with the display characters.

11. The light diffusion member as set forth in claim 10 wherein each light diffusion portion covers a corresponding display character of the plurality of display characters.

12. The light diffusion member as set forth in claim 1, wherein the plurality of light diffusion portions disuse the light to be irradiated into the display member for illuminating the display characters.

13. The light diffusion member as set forth in claim 1, wherein the plurality of light diffusion portions are disposed between the display member and a light source.

14. The light diffusion member as set forth in claim 13, wherein the light diffusion member prevents leakage of the light to display characters other than a specific display character corresponding to a specific light diffusion portion, the light being illuminated through the specific light diffusion portion.

15. The light diffusion member as set forth in claim 1, wherein each light diffusion portion of the plurality of light diffusion portions is a structure separate from one another, and connected to one another by the curved connection portion to form the light diffusion member as a single structure.

16. The light diffusion member as set forth in claim 1, wherein the curved connection portion prevents light, which has impinged from a predetermined one of the diffusion portions, from propagating through the curved connection portion and then impinging upon the other diffusion portions.

17. The light diffusion member as set forth in claim 1, wherein the curved connection portion prevents light emitted to a rear surface of a predetermined display character from impinging upon a rear surface of another display character.

18. The light diffusion member as set forth in claim 2, wherein each light diffusion portion of the plurality of light diffusion portions is a structure which covers a rear face of a respective display segment.

19. The light diffusion member as set forth in claim 2, wherein each display segment is a display lightguide.

20. A display comprising:

a light source, irradiating a light;

a light diffusion member, having a plurality of diffusion portions which diffuse the light from the light source, and having a curved connection portion which connects the diffusion portions; and a display portion, having a plurality of display characters to be illuminated by the diffused light, wherein the diffusion portions are placed so as to correspond to the display characters respectively.

* * * * *